US008117166B2

(12) United States Patent
Kodama

(10) Patent No.: US 8,117,166 B2
(45) Date of Patent: Feb. 14, 2012

(54) METHOD AND SYSTEM FOR CREATING SNAPSHOTS BY CONDITION

(75) Inventor: Shoji Kodama, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 321 days.

(21) Appl. No.: 12/176,733

(22) Filed: Jul. 21, 2008

(65) Prior Publication Data
US 2008/0288564 A1 Nov. 20, 2008

Related U.S. Application Data

(63) Continuation of application No. 11/206,183, filed on Aug. 18, 2005, now Pat. No. 7,403,960.

(30) Foreign Application Priority Data

Jul. 11, 2005 (JP) ................. 2005-201052

(51) Int. Cl.
*G06F 17/30* (2006.01)
(52) U.S. Cl. ...................................... 707/640
(58) Field of Classification Search .......... 707/639, 707/204, 640; 715/500
See application file for complete search history.

(56) References Cited

U.S. PATENT DOCUMENTS

| 5,819,292 | A | 10/1998 | Hitz et al. |
| 6,378,054 | B1 | 4/2002 | Karasudani et al. |
| 6,959,310 | B2 | 10/2005 | Eshel et al. |
| 6,981,114 | B1 | 12/2005 | Wu et al. |
| 7,155,465 | B2 * | 12/2006 | Lee et al. .............................. 1/1 |
| 7,403,960 | B2 * | 7/2008 | Kodama ....................... 707/639 |
| 2003/0158862 | A1 | 8/2003 | Eshel et al. |
| 2003/0221160 | A1 * | 11/2003 | Van Den Tillaart .......... 715/500 |
| 2004/0103104 | A1 | 5/2004 | Hara et al. |
| 2006/0075200 | A1 * | 4/2006 | Satoyama et al. ........... 711/162 |

FOREIGN PATENT DOCUMENTS

| JP | 02-227750 | 9/1990 |
| JP | 11-53240 | 2/1999 |
| JP | 2004-178289 | 6/2004 |

* cited by examiner

*Primary Examiner* — Etienne LeRoux
(74) *Attorney, Agent, or Firm* — Antonelli, Terry, Stout & Kraus, LLP.

(57) ABSTRACT

A data management method in a storage device system having a control device connected to a computer, and a storage device connected to the control device. The control device saves data stored in an area corresponding to a write request, and then writes the data to the area specified in the write request in accordance with the write request, if a file corresponding to the write request is a file meeting the conditions included in the request. Alternatively, the control device writes the data to the area corresponding to the write request in accordance with the write request, if a file corresponding to the write request is not a file meeting the conditions.

11 Claims, 21 Drawing Sheets

FIG.3

CONDITION MANAGEMENT TABLE 0301

| CONDITION ID | CONDITION | TARGET | UPPER LIMIT VALUE | USED CAPACITY | DISPLAY METHOD |
|---|---|---|---|---|---|
| 001 | USER NAME = 'KODAMA' | FS-A | 2GBYTES | 200MBYTES | CONDITION_MET |
| 002 | USER NAME = 'BRITNEY' | FS-A | 1GBYTES | 100MBYTES | ALL_FILES |
| 003 | FILE SIZE > 10MBYTES | FS-A | 10GBYTES | 1GBYTES | CONDITION_MET |
| 004 | KEYWORD "KUROYANAGI" | FS-B | 0.5GBYTES | 200MBYTES | LIST |
| ... | ... | ... | ... | ... | ... |

0302　0303　0304　0305　0306　0307

OVERALL FILE TREE

FILE TREE FOR SNAPSHOT
RELATIVE TO CONDITION 1

FILE TREE FOR SNAPSHOT
RELATIVE TO CONDITION 2

FIG.6

SNAPSHOT MANAGEMENT TABLE

| SNAPSHOT NUMBER | CONDITION ID | CREATION TIME |
|---|---|---|
| S0 | 001 | 15:15:15 DECEMBER 31ST 2112 |
| S1 | 001 | 16:15:15 DECEMBER 31ST 2112 |
| S2 | 002 | 17:15:15 DECEMBER 31ST 2112 |
| S3 | 001 | 18:15:15 DECEMBER 31ST 2112 |
| ⋮ | ⋮ | ⋮ |

FIG.7

FILE INODE INFORMATION

0501

| INODE NUMBER | 0001 |
|---|---|
| DELETE FLAG | OFF |
| POINTER | 0002 |
| CREATION DATE AND TIME | 01:01:01 JANUARY 1ST 2005 |
| UPDATE DATE AND TIME | 12:12:12 SEPTEMBER 3RD 2112 |
| OWNER | KODAMA |
| FILE SIZE | 12MBYTES |
| ACCESS CONTROL LIST | KODAMA = "READ/WRITE"<br>BRITNEY = "READ ONLY"<br>OTHERS = "DENY" |
| TYPE | FILE |
| POINTER TO BLOCK LIST | BL001 |

FIG.8

FILE SNAPSHOT INODE INFORMATION

0601

| INODE NUMBER | 0002 |
|---|---|
| POINTER | 0003 |
| SNAPSHOT NUMBER | S0 |
| CREATION DATE AND TIME | 01:01:01 JANUARY 1ST 2112 |
| UPDATE DATE AND TIME | 12:12:12 SEPTEMBER 3RD 2112 |
| OWNER | KODAMA |
| FILE SIZE | 12MBYTES |
| ACCESS CONTROL LIST | KODAMA = "READ/WRITE"<br>BRITNEY = "READ ONLY"<br>OTHERS = "DENY" |
| TYPE | FILE |
| POINTER TO BLOCK LIST | BL002 |

FIG.11

BITMAP TABLE

| BLOCK NUMBER | COUNT |
|---|---|
| 0000 0001 | 0 |
| 0000 0002 | 1 |
| 0000 0003 | 1 |
| 0000 0004 | 2 |
| 0000 0005 | 0 |
| ⋮ | ⋮ |

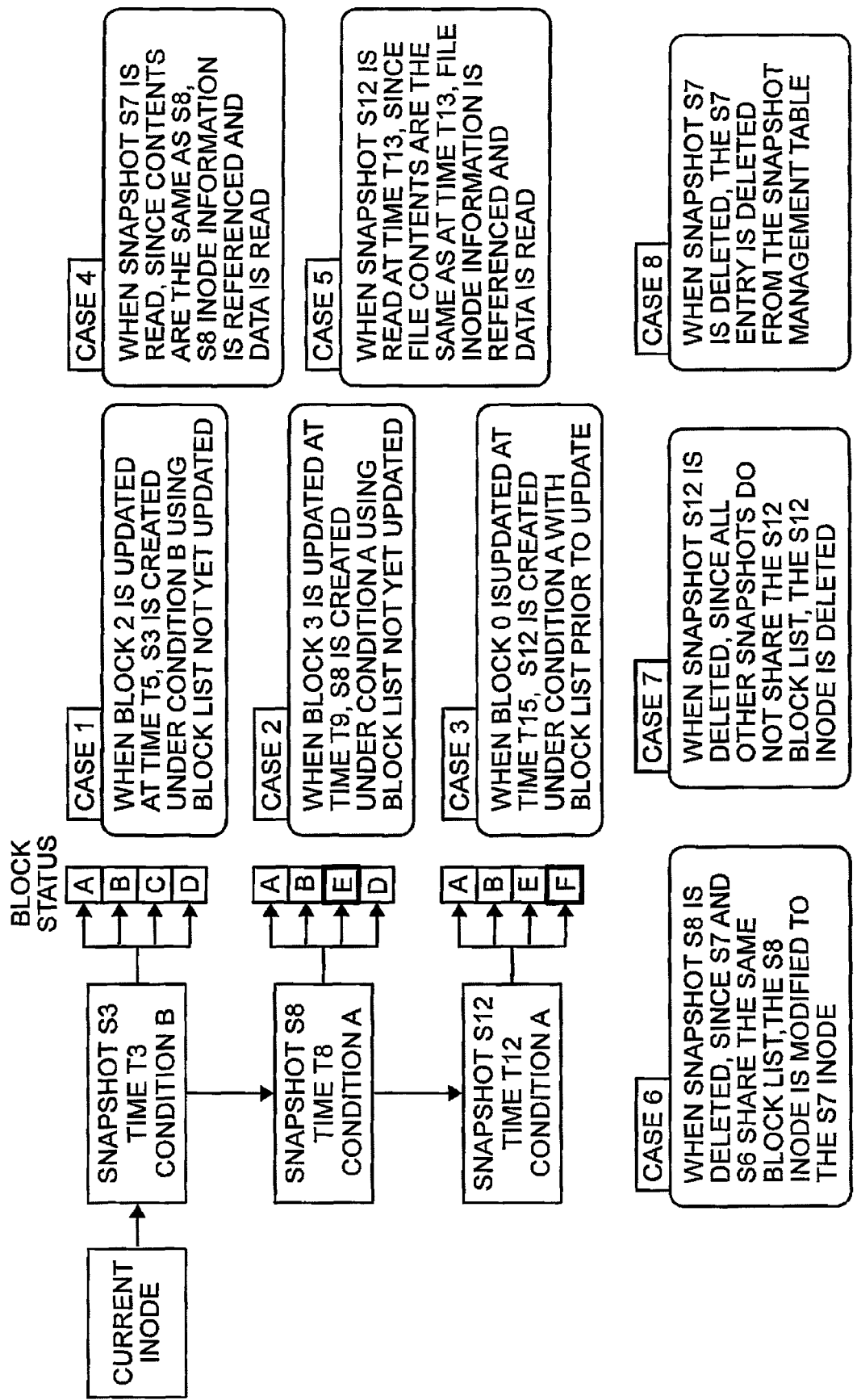

METHOD AND SYSTEM FOR CREATING SNAPSHOTS BY CONDITION

CROSS REFERENCE TO RELATED APPLICATION

This is a continuation of U.S. application Ser. No. 11/206,183, filed Aug. 18, 2005 now U.S. Pat. No. 7,403,960. This application relates to and claims priority from Japanese Patent Application No. 2005-201052, filed on Jul. 11, 2005. The entirety of the contents and subject matter of all of the above is incorporated herein by reference.

BACKGROUND OF THE INVENTION

1. Field of the Invention

The present invention relates to a storage device system for a computer system.

2. Description of the Related Art

Technology for the storage of the content of a file stored in the storage device system of a computer system at a certain point in time (referred to as a 'snapshot technology') is disclosed in U.S. Pat. No. 5,819,292. In this patent document, when the file is updated after a certain point in time, the content of the file prior to update are retained without being deleted to realize the snapshot technology.

According to U.S. Pat. No. 5,819,292, when a snapshot is created, a snapshot is created for all files stored in the storage device system. The problem of conventional technology is that, even when the storage device system includes files for which a snapshot is not required since a snapshot is created for all files in the storage device system, disk capacity is required to store a snapshot for all files, increasing the cost of the storage device system.

A storage device system having snapshot technology for efficiently using the storage device system, and reducing the cost of the storage device system, is therefore disclosed.

SUMMARY OF THE INVENTION

The storage device system of the present invention manages the conditions determining for which of the files stored in the storage device system a snapshot is to be created.

A storage device system efficiently using the storage area of the storage device system can be provided.

BRIEF DESCRIPTION OF THE DRAWINGS

FIG. 3 shows an example of the condition management table;

FIG. 6 shows an example of the snapshot management table;

FIG. 7 shows an example of inode information;

FIG. 8 shows an example of snapshot inode information;

FIG. 11 shows an example of the bitmap table;

FIG. 16B shows an example of changes in file inode information and snapshot inode information;

DESCRIPTION OF THE PREFERRED EMBODIMENTS

The embodiments of the present invention are described in reference to the figures. The present invention is not limited to the present embodiments.

In the following figures, the lower case letters a, b, c, . . . and the like applied to component names and component numbers are used to distinguish between a plurality of components of the same configuration. In the following description, when it is unnecessary to distinguish between a plurality of components having the same configuration, these lower case letters are omitted, and when it is necessary to identify each component, these components are described using the names and numbers to which the lower case letters are applied.

Figure 1:
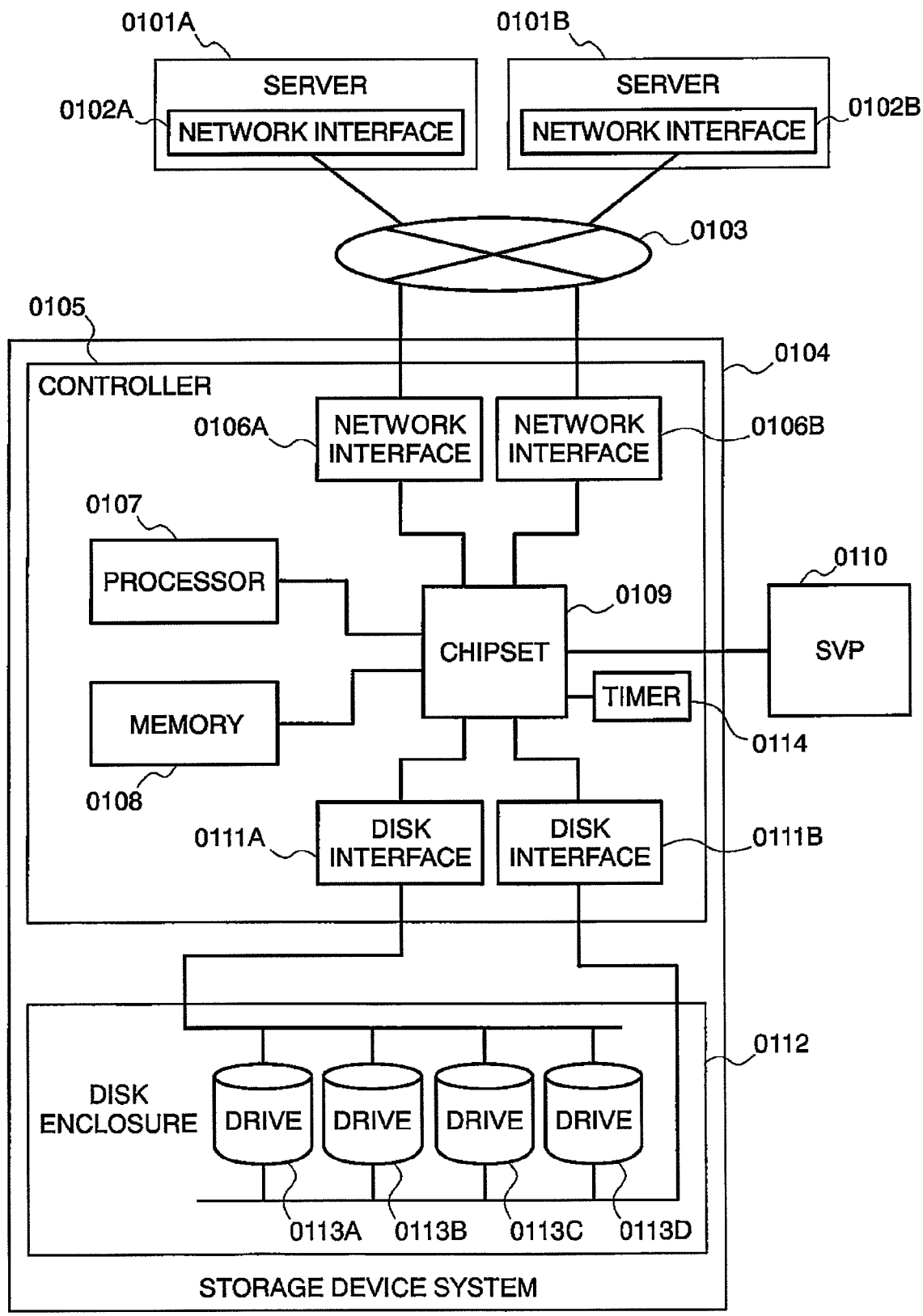
FIG. 1 shows an example of the computer system.

FIG. 1 shows an example of the computer system in the present embodiment. The computer system has a server 0101, a storage device system 0104, a network 0103, and an SVP 0110.

The server 0101 is connected to the storage device system 0104 via the network 0103, and processes the data stored in the storage device system 0104. The storage device system 0104 stores data handled by the server 0101. The SVP 0110 manages the storage device system 0104, and is connected to the chipset 0109 in the storage device system 0104 (described later).

The configuration of the computer system is not limited to that shown in FIG. 1, and may have a plurality of storage device systems 0104 and SVPs 0110.

The server 0101 has a network interface 0102, and is connected to the network 0103 via the network interface 0102.

The storage device system 0104 has a controller 0105 and a disk enclosure 0112.

The controller 0105 controls the storage device system 0104. The controller 0105 has network interfaces 0106*a* and 0106*b*, a processor 0107, a memory 0108, a timer 0114 conducting time management, disk interfaces 0111*a* and 0111*b*, and a chipset 0109. The network interfaces 0106*a* and 0106*b*, the processor 0107, the memory 0108, the timer 0114, and the disk interfaces 0111*a* and 0111*b*, are mutually connected via the chipset 0109.

The disk enclosure 0112 has drives 0113. Data is stored on drives 0113*a*, 0113*b*, 0113*c*, and 0113*d*.

The configuration of the storage device system is not limited to that shown in FIG. 1, and may have a plurality of controllers 0105, processors 0107, memories 0108, disk interfaces 0111, and disk enclosures 0112.

Figure 2:
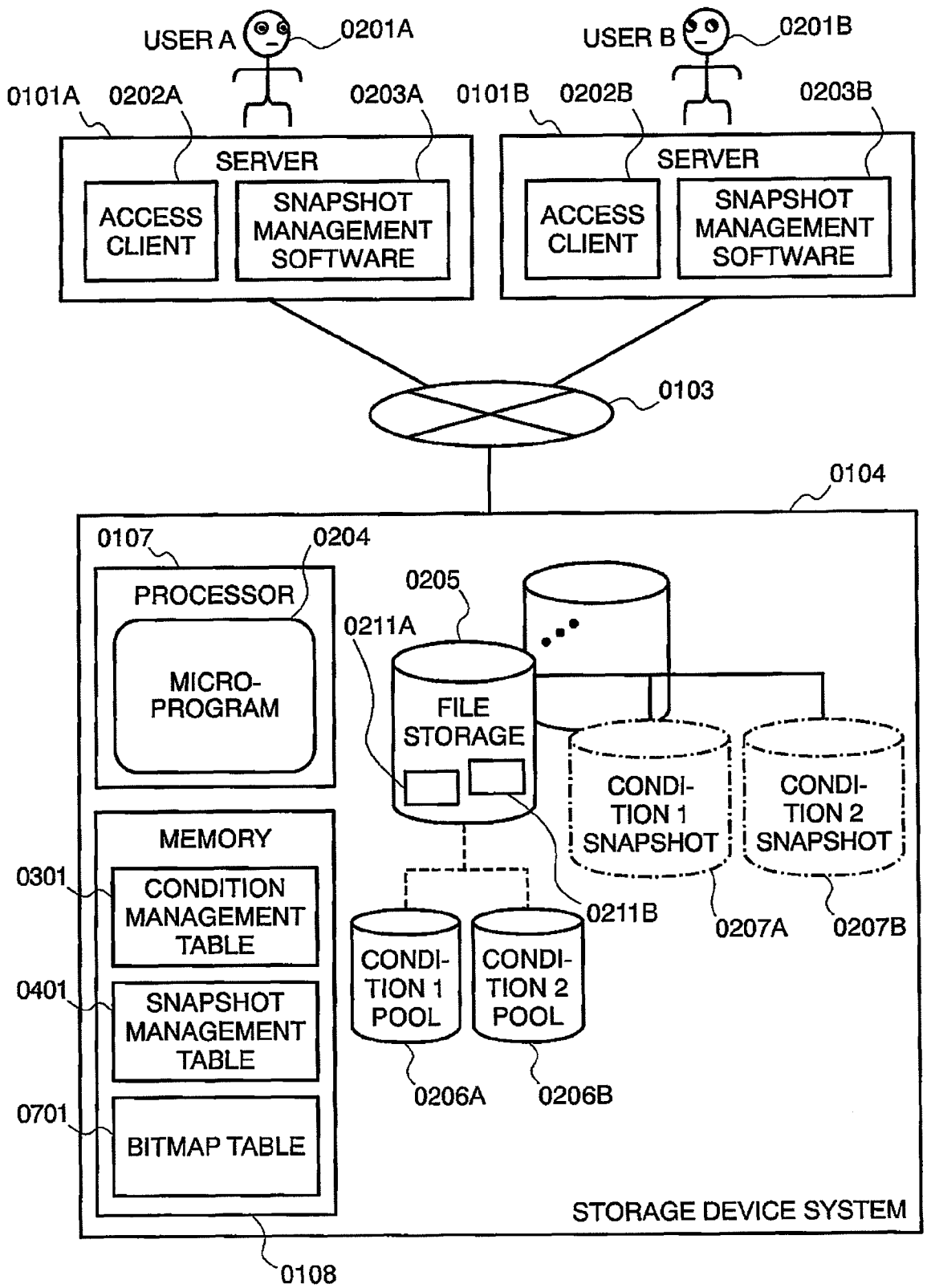
FIG. 2 shows an example of the logical configuration of the computer system.

FIG. 2 shows an example of the logical configuration of the computer system.

The server 0101 has an access client 0202, and snapshot management software 0203.

The access client 0202 reads and writes files 0211a and 0211b stored in the storage area 0205 of the storage device system 0104.

In accordance with user 0201 requests, the snapshot management software 0203 requests the storage device system 0104 to create and delete snapshots 0207a and 0207b in file storage 0205a, and to setup access by the user 0201 to snapshots 0207a and 0207b. Requests to create and delete snapshots may be issued by the system manager using the SVP 0110.

The micro-program 0204 runs on the processor 0107. The micro-program 0204 executes processing of requests for access to files from the server 0101, storage of data on the disk drive 0113, and creation and deletion of snapshots.

The condition management table 0301, the snapshot management table 0401, and the bitmap table 0701 are stored in the memory 0108. The condition management table 0301, the snapshot management table 0401, and the 0701 are described in detail below.

The storage device system 0104 has file storage 0205 storing files 0211a and 0211b. The storage device system 0104 may have a plurality of file storage. In the present embodiment, a single file storage is described to simplify the description.

Pools 0206a and 0206b are associated with file storage 0205 for storage of old file data. Old file data is data prior to update when data in a file is updated. Furthermore, snapshots 0207a and 0207b for access to file content at a certain point in time are associated with file storage 0205. The number of pools existing is equal to the number of conditions, and an upper limit is set for a capacity of a pool in which old files can be stored Conditions are conditions specified externally for determining the files for which a snapshot is created (hereafter referred to as 'conditions').

FIG. 3 shows an example of the condition management table 0301.

The micro-program 0204 employs the condition management table 0301 to manage information related to conditions. The condition management table is configured by the storage manager and the like using the SVP 0110. When a condition is registered in the condition management table 0301, the storage device system 0104 receiving the request to register information related to the condition from the SVP 0110 registers the information related to the condition in the condition management table 0301 based on the request. The storage device system 0104 receiving a request from the SVP 0110 to delete information registered in the condition management table 0301 checks that the files and snapshots meeting the condition are deleted, and then deletes the condition from the condition management table 0301. The upper limit value 0305 and display method 0307 described below can be modified from the SVP 0110. When changing the upper limit value 0305, an error is returned to the SVP 0110 if the storage device system 0104 determines that the modification is a modification reducing the current upper limit value 0305 and the modified upper limit value 0305 is less than the used capacity 0306.

The condition ID 0302, the conditional expression 0303, the target 0304, the upper limit value 0305, the used capacity 0306, and the display method 0307 are managed with the condition management table.

The condition ID 0302 is an identifier assigned to each condition.

The conditional expression 0303 indicates the condition content. The attribute information related to the file, and content stored in the file, are specified as the conditional expression 0303. For example, in the conditional expression User name='Kodama', the file for which the owner is 'Kodama' is the target of creation of a snapshot. Furthermore, if the conditional expression is File size >10 Mbytes, files having a size greater than 10 Mbytes are the target of creation of a snapshot. With the conditional expression having Keyword='Kuroyanagi', when the content stored in the files are text documents, the document content are searched, and only files including the term 'Kuroyanagi' are the target of creation of snapshots.

The target 0304 is a file storage identifier using the condition.

The upper limit value 0305 is the upper limit value for the pool capacity corresponding to the condition.

The used capacity 0306 indicates the currently used pool capacity.

The display method 0307 indicates the display method for the configuration of the directory and files when the user 0201 requests the computer system for listing of files stored in the snapshot 0207. The listing refers to the configuration of the directory and files related to the snapshot number and the like displayed by the storage device system 0104 on the display interface and the like used by the user 0201 when the user 0201 sends a command including the snapshot number and the like to the computer system.

In the present embodiment, a snapshot is created only for files meeting the conditions. Thus, at the time the snapshot 0207 was created, the snapshot 0207 was not created for files existing in the file storage 0205 but not meeting the conditions. With the display method 0307, when the user 0201 requests the computer system for a file listing from the snapshot 0207 directory tree, the storage device system 0104 indicates the display method for displaying whether or not files for which a snapshot 0207 was not created, or whether these files are to be displayed as a list and not displayed in directory format, on the display interface.

The display method indicated by the display method 0307 is described in detail using FIG. 4.

Figure 4A:
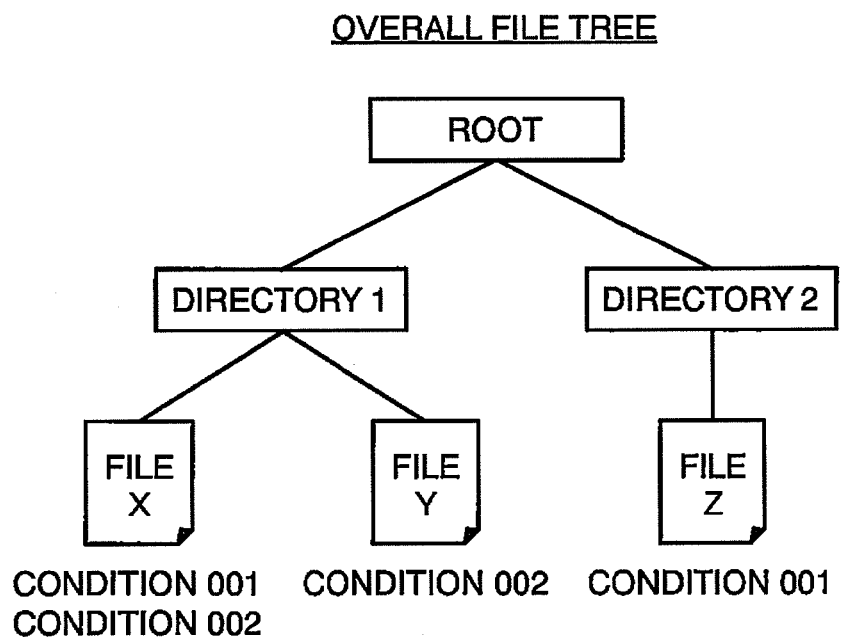
FIG. 4A shows an example of the file system tree.

FIG. 4A shows an example of the overall file system tree. The file X meets conditions 001 and 002. The file Y meets condition 002. The file Z meets condition 001.

Figure 4B:
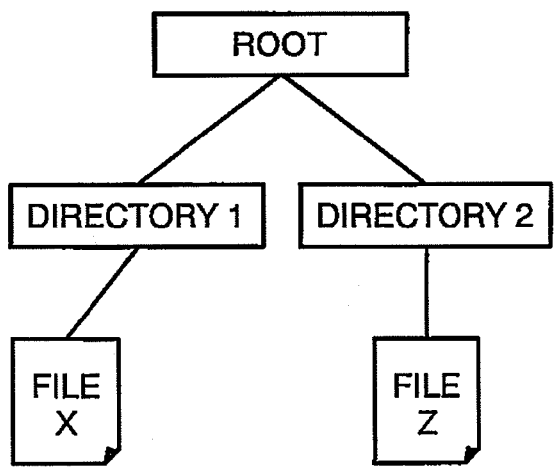
FIG. 4B shows an example of the file system tree.

FIG. 4B shows an example of a file system tree of the directory and file configuration displayed on the display interface and the like when the display method 0307 is 'CONDITION_MET'. Only files which meet the conditions can be listed by the user 0201 from the snapshot 0207. In other words, when a snapshot related to the condition 001 is created, as shown in the file system tree in FIG. 4B, the files X and Z can be listed from the snapshot meeting the condition 001. Since file Y did not meet the condition 001, the old data at the point in time at which the snapshot was created is not stored, and since the condition 001 display method 0307 is 'CONDITION_MET', file Y is not listed from the snapshot meeting condition 001.

Figure 4C:
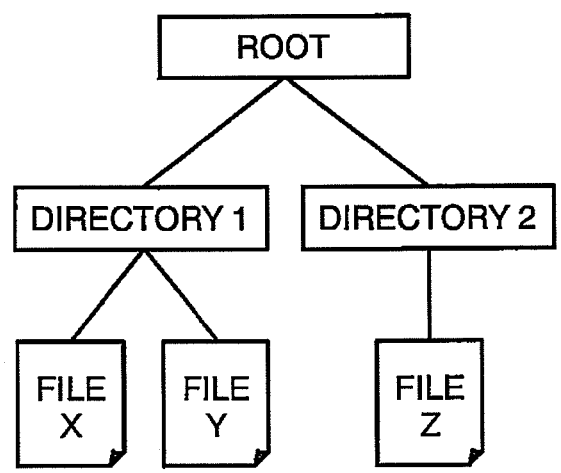
FIG. 4C shows an example of the file system tree.

FIG. 4C shows an example of a file system tree of the directory and file configuration displayed on the display interface and the like when the display method 0307 is 'ALL_FILES'. When a snapshot related to condition 002 is created, the user 0201 can list not only files meeting the condition 002, but also files not meeting the condition 002, from the snapshot meeting the condition 002. However, the content of files not meeting the condition 002 are not the file content at the point in time at which the snapshot was created, but the content of the file created prior and closest to that time.

The display method for files not meeting condition 002 are described in detail using FIG. 5.

Figure 5A:
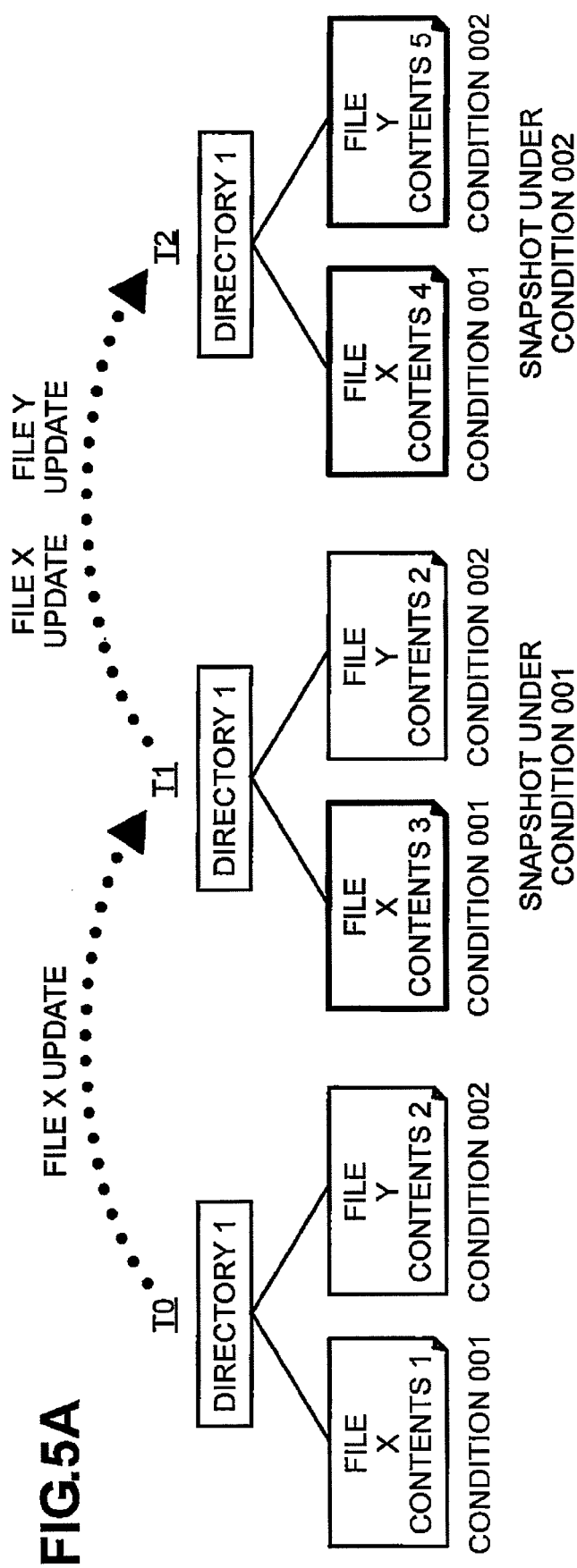
FIG. 5A shows an example of the time sequence with which files are updated.

FIG. 5A shows an example of the time sequence with which files X and Y are updated. At time T0, file X has content 1, and file Y has content 2. File X meets condition 001, and file Y meets condition 002. File X is updated to content 3 between time T0 and T1. File X is updated to content 4, and file Y is updated to content 5, between time T1 and T2. The condition 001 snapshot is created at time T1, and the condition 002 snapshot is created at time T2. In other words, the file X content 4 are stored in the condition 002 snapshot.

Figure 5B:
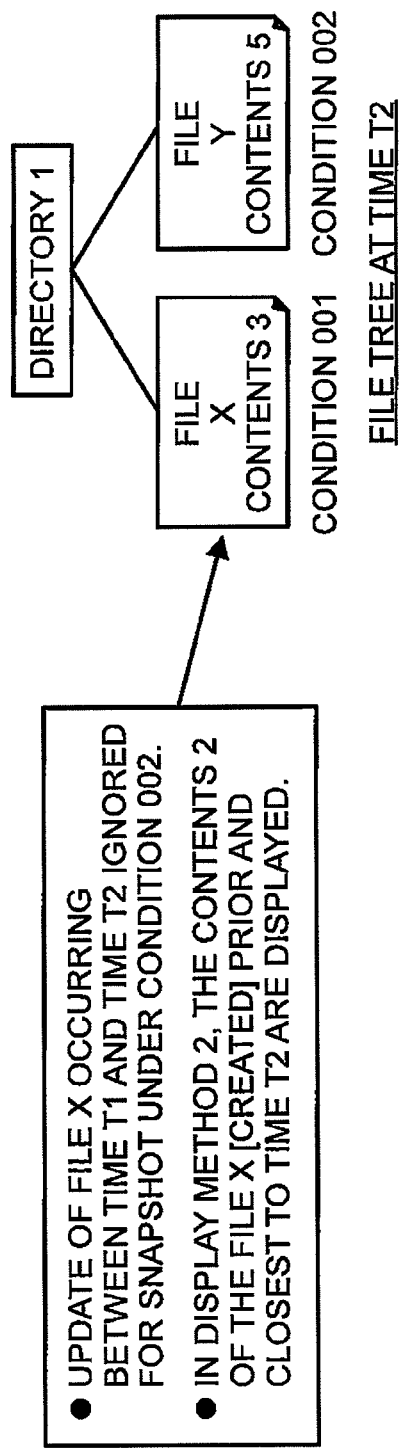
FIG. 5B shows an example of the file system tree.

FIG. 5B shows an example of a file system tree of the directory and file configuration sent to the display interface and the like when the display method 0307 is 'ALL_FILES' and listing of a snapshot with condition 002 has been requested by the user 0201. As shown in FIG. 5B, the content 5 file is listed for file Y, and the content 3 file is listed for file X stored in the condition 001 snapshot created prior and closest to time T2.

When the display method 0307 is 'LIST', a list of path names of all files for which a snapshot was created are sent to the display interface and the like.

In FIG. 3, an Internet browser can be used as the method of accessing files meeting conditions. In this case, the user 0201 accesses the snapshot in the storage device system 0104 via the Internet browser. The storage device system 0104 creates an HTML file having links to snapshots of files stored in the snapshot, and returns the file to the Internet browser. When the user 0201 clicks on a link with the mouse, the file name corresponding to the link is sent to the storage device system 0104. The storage device system 0104 transfers the file corresponding to the received file name to the Internet browser. The user 0201 can also store the file on the server, and can also open the file in an application.

FIG. 6 shows an example of the snapshot management table 0401.

The micro-program 0204 manages information related to the created snapshots using the snapshot management table 0401.

The snapshot number 0402, the condition ID, and the creation time 0404 are managed with the snapshot management table 0401.

The snapshot number 0402 is an identifier allocated to a snapshot created with the micro-program 0204.

The condition ID 0403 indicates the condition ID specified when creation of a snapshot is requested.

The creation time 0404 indicates the time at which a snapshot was created with the micro-program 0204.

Creation of a snapshot is requested via the user 0201 snapshot management software 0203. Furthermore, the storage manager can also use the SVP 0110 to request creation of a snapshot. The condition ID is specified when the user 0201 or the storage manager requests creation of a snapshot.

FIG. 7 shows an example of inode information managing the files and directory files stored in the storage device system 0104.

The files in the storage device system 0104 are managed as a tree structure with the directories. Directory files are special files in the file system using lists to manage sets of directory names and inode numbers for the directory and sets of file names and inode numbers for the file, for directories and files in a given directory.

In the present embodiment, the file type 0511 or file type 0611 is used to determine whether the inode information 0501 or the snapshot inode information 0601 is a normal file or a directory file. If the type is 'File', a normal file is indicated, and if the type is 'Directory', a directory file is indicated. In the present embodiment, only the inode information 0501 corresponding to the normal file is described to simplify the description.

Since a file is comprised of a list of blocks, inode information is information for managing which block list a file is comprised from. The block from which the file is comprised is managed with the block list. For example, a file indicated with the inode number 0502 is comprised from a block included in the block list indicated in the block list pointer 0510.

The delete flag 0503 indicates whether or not a file has been deleted. The delete flag 0503 is ON when a file and a snapshot corresponding to the file is deleted. The delete flag 0503 is OFF when no files or snapshots corresponding to the file have been deleted. In other words, even if a file indicated in the inode information 0501 is deleted, the inode information for the file is not deleted unless the snapshot corresponding to the file is deleted.

The pointer 0504 for the snapshot inode information 0601 managing the snapshot corresponding to the file is managed with the inode information 0501.

Furthermore, attribute information related to the file such as creation date and time 0505, update date and time 0506, owner 0507, file size 0508, and access control list 0509 are managed with inode information 0501.

FIG. 8 shows an example of the snapshot inode information 0601.

The snapshot inode information 0601 is pointed to from the pointer 0504, and is information for managing file old content corresponding to the pointed source inode information 0501.

The pointer 0603 is used when a plurality of snapshots correspond to a certain file, and indicates the pointer to snapshot inode information 0601 managing other old content of a file corresponding to the pointed source inode information 0501. The snapshot inode information 0610 pointed to from the inode information 0501, and the snapshot inode information 0610 pointed to from the snapshot inode information 0610, are referred to as snapshot inode information 0601 linked from inode information 0501.

The snapshot indicated by inode number 0602 is comprised of blocks included in the block list indicated by the block list pointer 0610.

Furthermore, creation date and time 0606, update date and time 0607, owner 0608, file size 0609, and access control list 0610 are managed as attribute information related to the file snapshot with snapshot inode information 0601.

Furthermore, the snapshot number 0604 identifying the snapshot is managed with snapshot inode information 0601.

Figure 9:
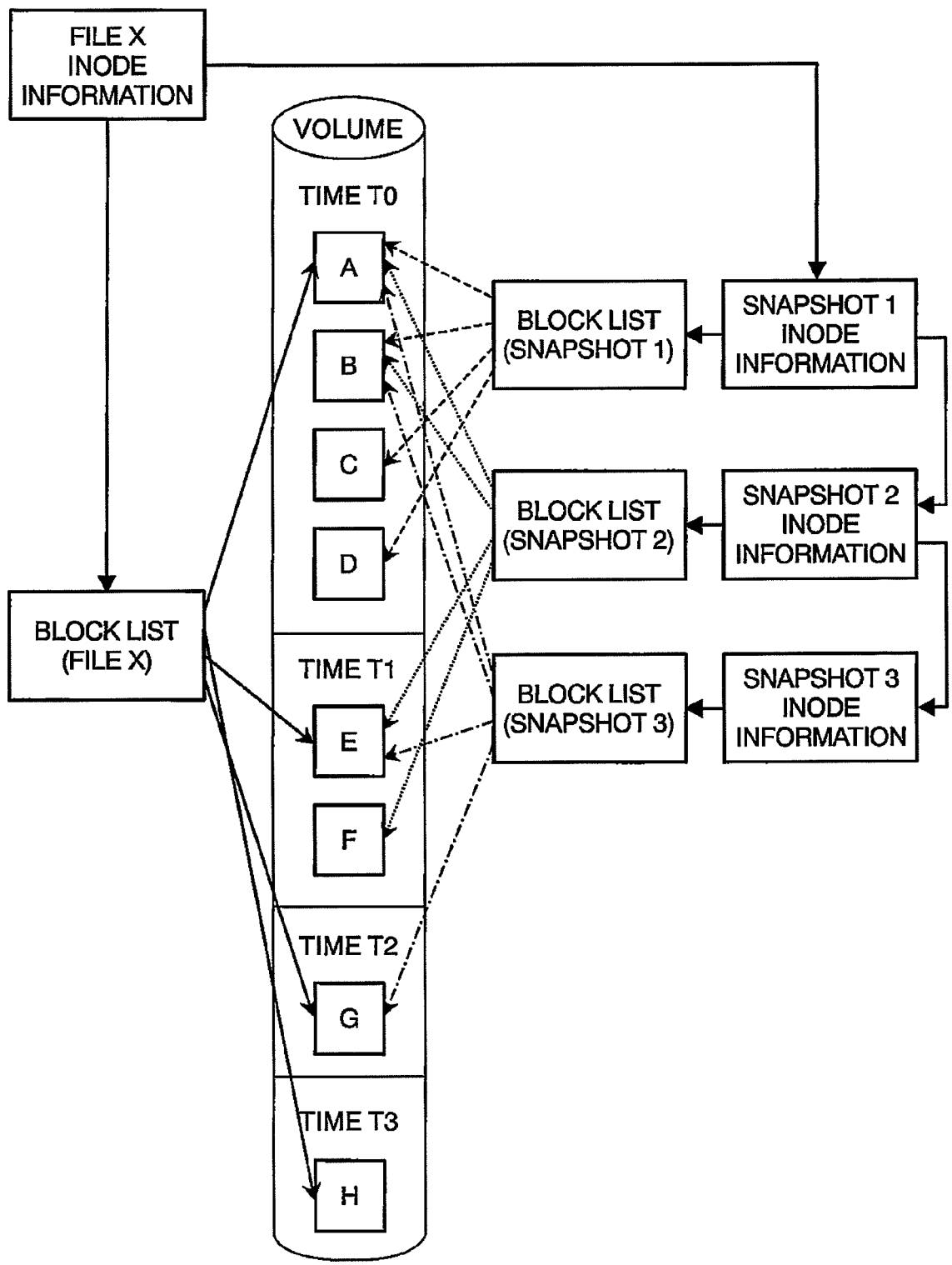
FIG. 9 shows an example of the file and the block configuration of the snapshot for the file.

FIG. 9 shows an example of the file and the block configuration of the snapshot for the file.

An example in which three snapshots exist in file X is described below.

File X is comprised of blocks included in the block list pointed to by the file X inode information 0501. In this case, at time T3, file X is comprised of blocks A, E, G, and H. Since snapshot 1 is file X inode information 0501, snapshot 1 is managed with snapshot inode information 0601 pointed to by pointer 0504. Snapshot 1 indicates file X content at time T0, and is comprised of blocks A, B, C, and D. Snapshot 2 is managed with snapshot inode information 0601 pointed to by the pointer 0603 of the snapshot inode information 0601 of snapshot 1. Snapshot 2 indicates file X content at time T1, and is comprised of blocks A, B, E, and F. Snapshot 3 is managed by the snapshot inode information 0601 pointed to by the pointer 0603 of the snapshot inode information 0601 of snapshot 2. Snapshot 3 indicates file X content at time T2, and is comprised of blocks A, B, E, and G.

Thus, the three snapshot inode information 0601 are pointed to and managed in order from inode information 0501.

Figure 10:
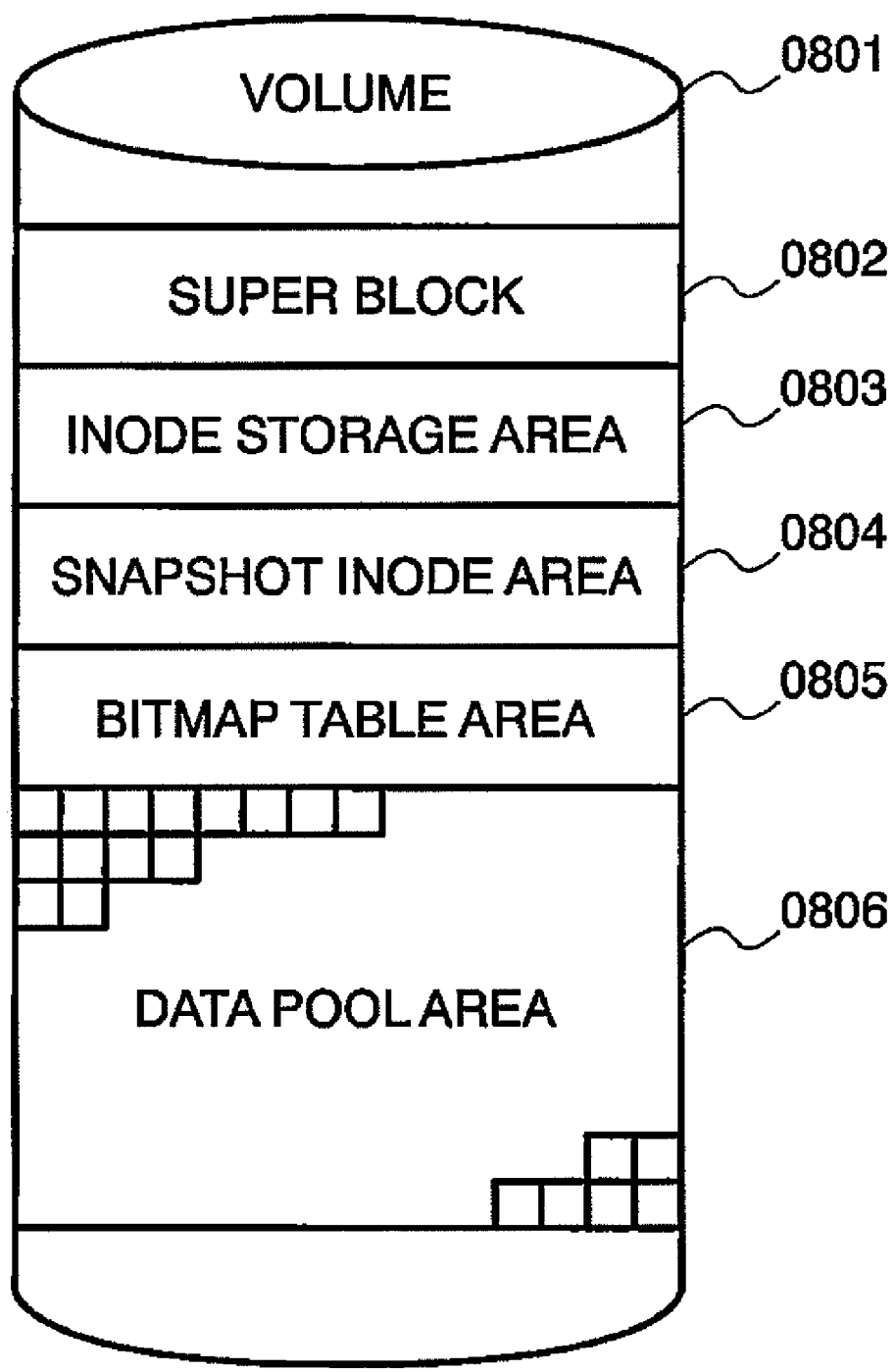
FIG. 10 shows an example of the configuration of the file storage.

FIG. 10 shows an example of the configuration of the file storage 0205 in the volume 0801. The volume 0801 is a logical disk volume, and is comprised of a plurality of disk drives 0113. For example, volume 0801 is comprised of a RAID using the plurality of disk drives 0113.

The super block 0802 is an area in which information related to the file system created in the volume 0801 is recorded. In practice, super block 0802 records information such as addresses and sizes in the volume of various types of information such as file system creation date and time, volume size, and file system size, and inode storage area 0803, snapshot inode area 0804, bitmap table area 0805, and data pool area 0806 and the like.

The inode storage area 0803 is an area in which file inode information is stored.

The snapshot inode area 0804 is an area in which snapshot inode information is stored.

The bitmap table area 0805 is an area in which the bitmap table 0701 described below is stored.

The data pool area 0806 is an area in which file content, directory list content, block lists, and file old content and the like are stored. The directory list is a list recording sets of directory names and directory inode numbers, and sets of file names and file inode numbers, existing in the directory. The data pool area 0806 is divided into blocks of fixed size.

FIG. 11 shows an example of the bitmap table 0701.

The bitmap table 0701 is information for managing usage of the data pool area 0806.

The number is counted to the count 0703 for each block number 0702. The count is set to 1 when the block indicated by the block number 0702 is allocated file storage. The count is incremented if the block is the block used in the snapshot for the file. When a snapshot is deleted, the count is decremented, and when all snapshots are deleted the count is returned to 1. In other words, the count is set to 0 when the file is deleted and all snapshots are also deleted.

Figure 12:
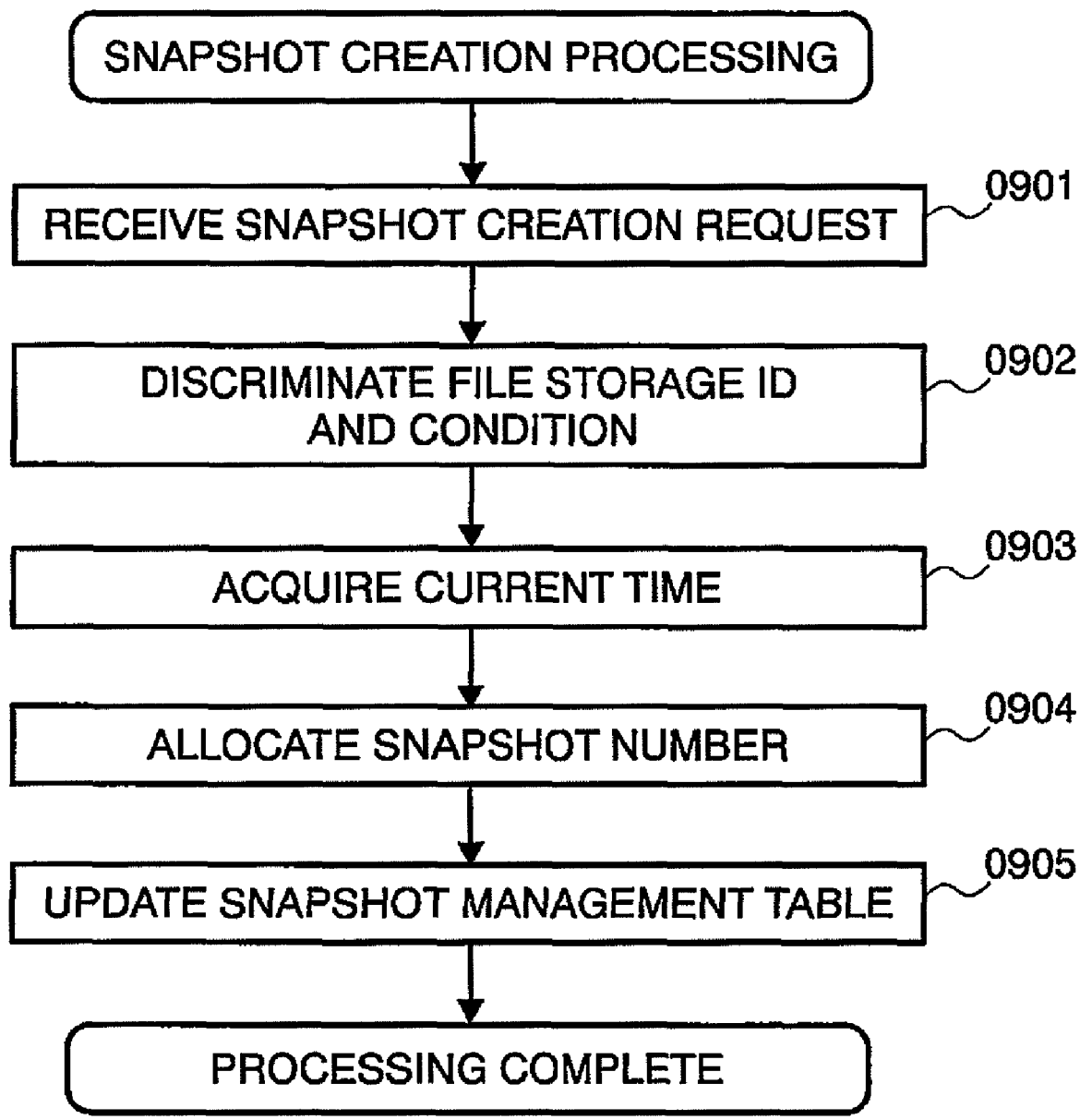
FIG. 12 shows an example of snapshot create processing.

FIG. 12 shows an example of snapshot create processing executed by the micro-program 0204.

The micro-program 0204 receives a snapshot creation request including the condition ID from the server 0101 (step 0901).

Next, the micro-program 0204 uses the condition management table 0301 to determine the files matching the information indicated in the condition ID for which a snapshot is to be created (step 0902). In the present embodiment, a directory file snapshot is always created for directory files.

Next, the micro-program 0204 acquires the current time from the timer 0114 (step 0903).

The micro-program 0204 references the snapshot management table 0401, and allocates the snapshot number of the snapshot corresponding to the file (step 0904). When a plurality of files matching the information indicated by the condition ID exist, a snapshot number is allocated for each snapshot corresponding to each file.

Finally, the micro-program 0204 records the snapshot number allocated in the snapshot step 0904, the condition ID received in step 0901, and the current time acquired in step 0903, in the snapshot management table 0401 (step 0905).

Figure 13:
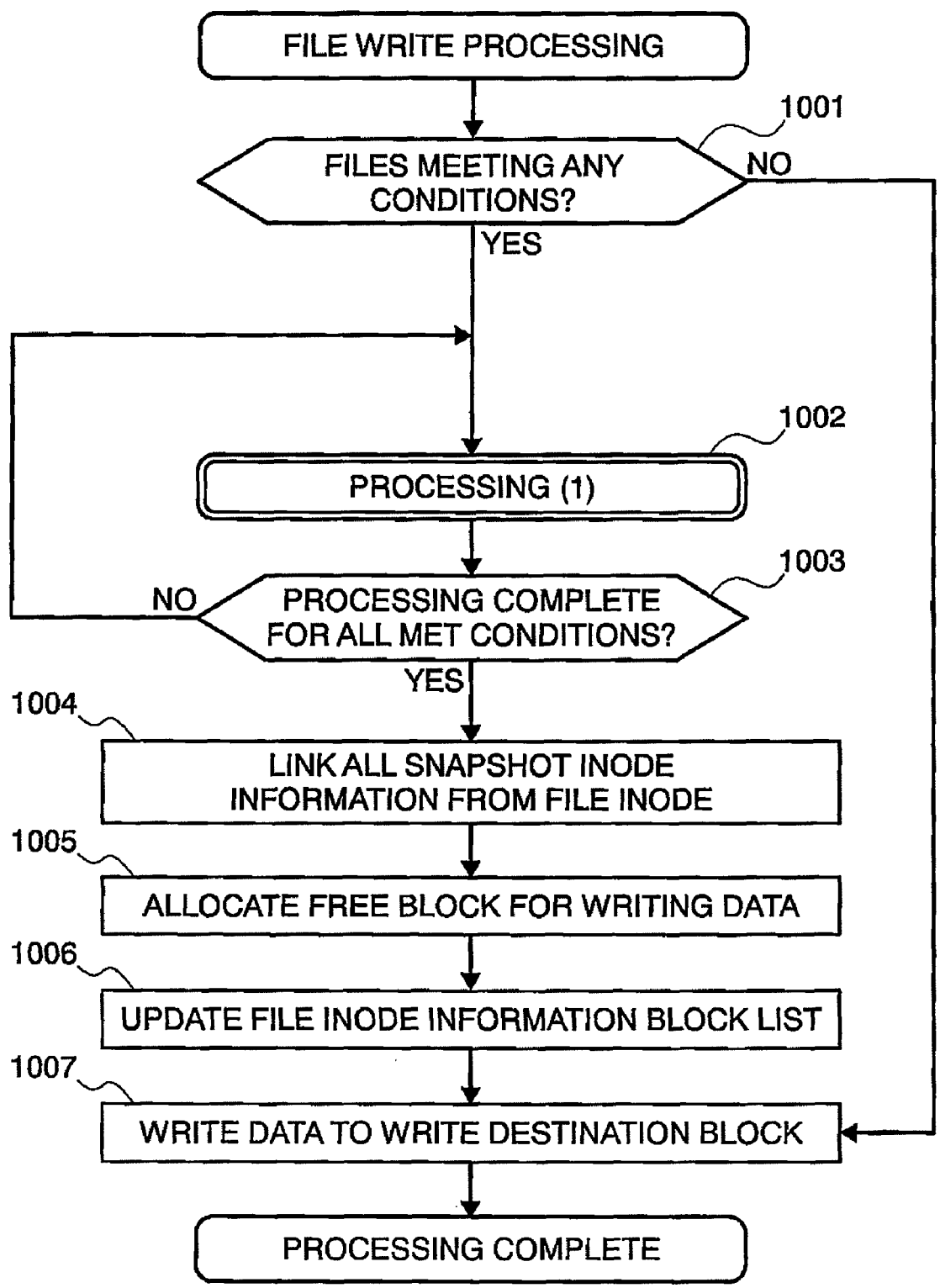
FIG. 13 shows an example of file write request processing.

FIG. 13 shows an example of file write request processing executed by the micro-program 0204. A file write request is issued by the access client 0202 for files stored in file storage 0205a.

Furthermore, the processing shown in FIG. 13 is executed by the micro-program 0204 at directory file update associated with addition, deletion, and modification and the like of files and directories.

The micro-program 0204 evaluates whether or not files specified in the file write request meet any of the conditions stored in the condition management table 0301 (step 1001).

Since snapshot processing is not performed when the files meet none of the conditions stored in the condition management table 0301, data is written to the block in the block list indicated by the pointer 0510 to the block list included in the inode information (1008).

Step 1002 is executed when the files meet the conditions stored in the condition management table 0301. Step 1002 is described in detail below. When processing in step 1002 is complete, the micro-program 0204 checks whether or not processing in step 1002 is complete for all met conditions (step 1003).

When processing in step 1002 is not complete for all conditions met in step 1001, the micro-program 0204 repeats the processing in step 1002.

When the micro-program 0204 completes processing in step 1002 for all conditions met in step 1001, all snapshot inode information created in step 1002 is set so that all snapshot inode information is linked from the file inode information (step 1005).

Next, the micro-program 0204 allocates a free block for writing write data using the bitmap table 0701 (step 1006).

The micro-program 0204 then updates the block list for the file inode information 0501 to the block list including the block allocated in step 1006 (step 1007).

Finally, the micro-program 0204 writes the write data to the block allocated in step 1007 (step 1008).

Figure 14:
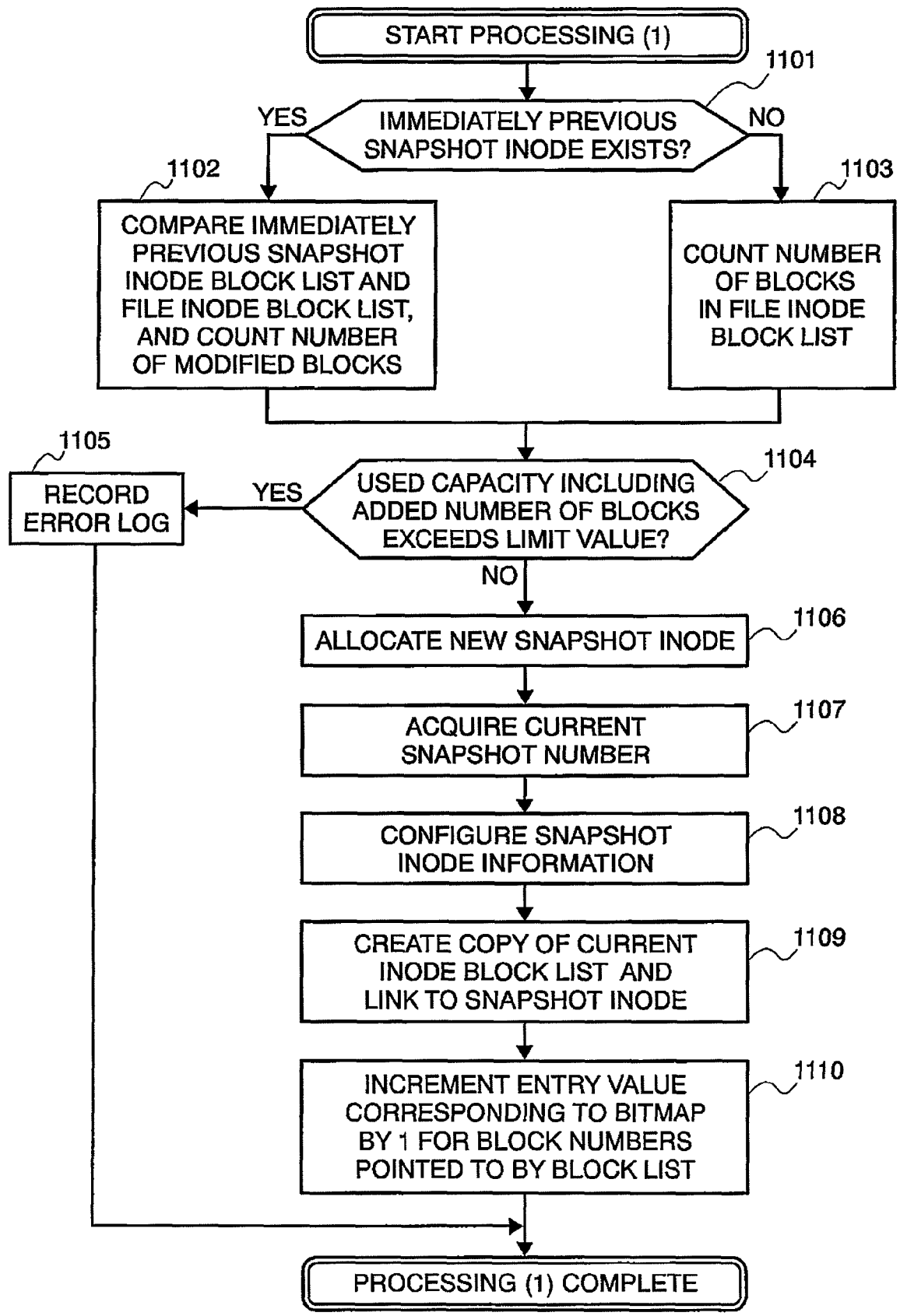
FIG. 14 shows an example of processing within the file write processing.

FIG. 14 shows an example of processing in step 1002.

In step 1002, the micro-program 0204 creates snapshot inode information 0601 for storing content prior to file update for each condition met in step 1001 in FIG. 13.

The micro-program 0204 checks whether or not an immediately previous snapshot exists for the condition using snapshot inode information 0601 linked to the file inode information 0501 (step 1101). An immediately previous snapshot is the snapshot created closest to the current time.

When an immediately previous snapshot exists, the block list pointed to by the pointer 0610 to the block list of the snapshot inode information 0601 of the immediately previous snapshot, and the block list pointed to by the pointer 0510 to the block list of the inode information 0501 of the file, are compared, and the number of modified blocks counted (step 1102).

When an immediately previous snapshot does not exist, since this snapshot is the first snapshot created for the condition for this file, the number of blocks in the block list pointed to by the pointer 0510 to the block list of the file inode information 0501 is counted (step 1103).

Next, the micro-program 0204 references the currently used capacity 0306 for the condition using the condition management table 0301 and determines whether or not a value being the sum of the currently used capacity 0306 for the condition and a disk capacity equivalent to the number of blocks counted in step 1102 or step 1103 exceeds the upper limit value 0305 for the condition (step 1104). When a value being the sum of the currently used capacity 0306 for the condition and the differential data exceeds the upper limit value 0305 for the condition, since no further snapshots can be created under the condition, the micro-program 0204 records the error log in SVP 0110 (step 1105) and terminates step 1002.

When the value being the sum of the currently used capacity 0306 for the condition and the differential data does not exceed the upper limit value 0305 for the condition, the micro-program 0204 creates new snapshot inode information 0601 (step 1106).

Even when a plurality of users share the storage device system 0104 by conducting the processing in step 1104, fair access between users 0201 can be guaranteed. In other words, when a plurality of users 0201 share the storage device system, and a large difference exists in the capacity of files owned by each user 0201 in the storage device system 0104 and a snapshot is created, users owning large numbers of files, and users frequently updating files, sometimes consume considerable pool capacity for storage of old content. In consideration of this case, the situation in which the necessary snapshots can no longer be created, and the behavior of particular users 0201 hinders other users 0201, can be prevented by conducting the processing in step 1104.

Next, the micro-program 0204 acquires the latest snapshot number 0402 under the conditions using the snapshot management table 0401 (step 1107). The micro-program 0204 then records the snapshot inode information 0601 necessary for the snapshot (step 1108). In practice, the micro-program 0204 copies information belonging to the file such as creation date and time and the like from the file inode information 0501, and records the snapshot number 0402 acquired in step 1107 in the snapshot number 0604.

Next, the micro-program 0204 creates a copy of the block list indicated by the pointer 0510 pointing to the block list of the file inode information 0501, and sets the copy so that the copy is linked from the inode information 0501 to the snapshot inode information 0601 (step 1109).

Finally, the corresponding entry value of the bitmap table 0701 is incremented by 1 for the block number pointed to by the block list (step 1110).

When the directory file is updated in step 1001, all conditions are met. In other words, directory modifications are always stored for snapshots under all conditions. Thus, even if the file is deleted, that file inode information 0501 can be tracked from the directory snapshot.

Furthermore, when the used capacity 0306 exceeds the upper limit value 0305 in step 1104, the used capacity 0306 is reduced by deleting the oldest snapshot, and the snapshot create processing can also be continued.

Figure 15:
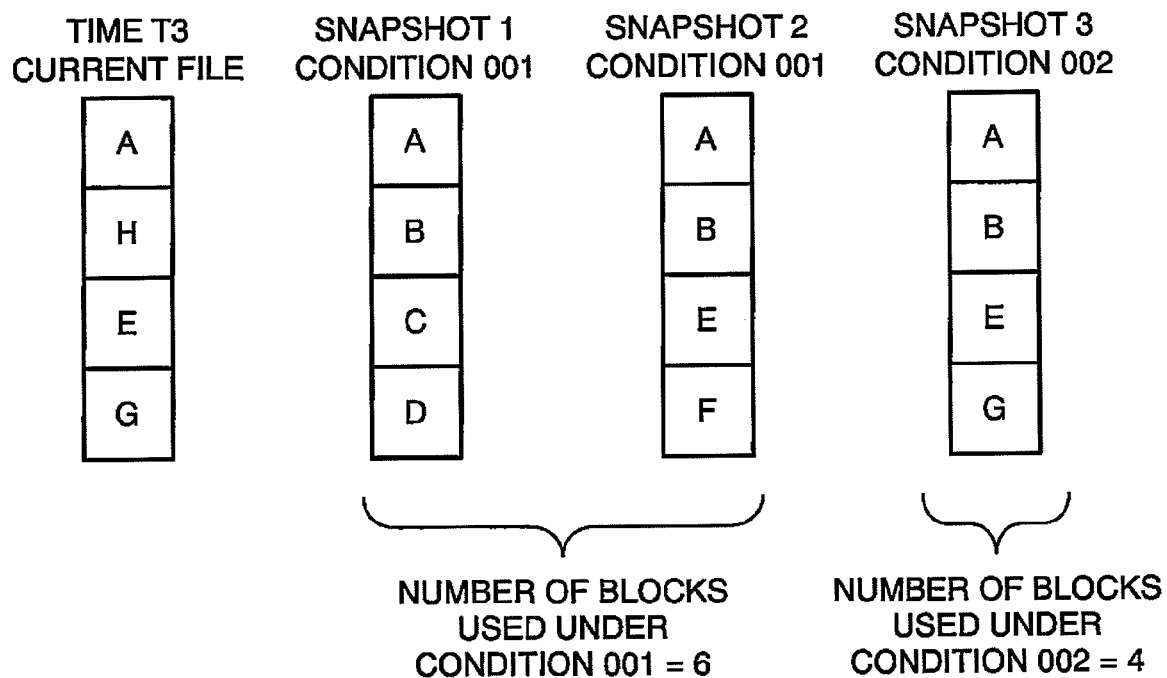
FIG. 15 shows an example of the method of calculating the number of used blocks for each condition.

FIG. 15 shows an example of the method of calculating the number of used blocks for each condition.

When the two snapshots snapshot 1 and snapshot 2 are created for the snapshot corresponding to the condition 001, a total of six blocks store old data. Since snapshot 1 and snapshot 2 both use blocks A and B, the number of blocks used to secure the snapshot corresponding to the condition 001 is reduced.

Furthermore, when the snapshot corresponding to condition 002 is snapshot 3, four blocks are used to store old data. In the example in FIG. 15, blocks A, B, and E are used in common with condition 001 and condition 002, and are double-counted.

Figure 16A:
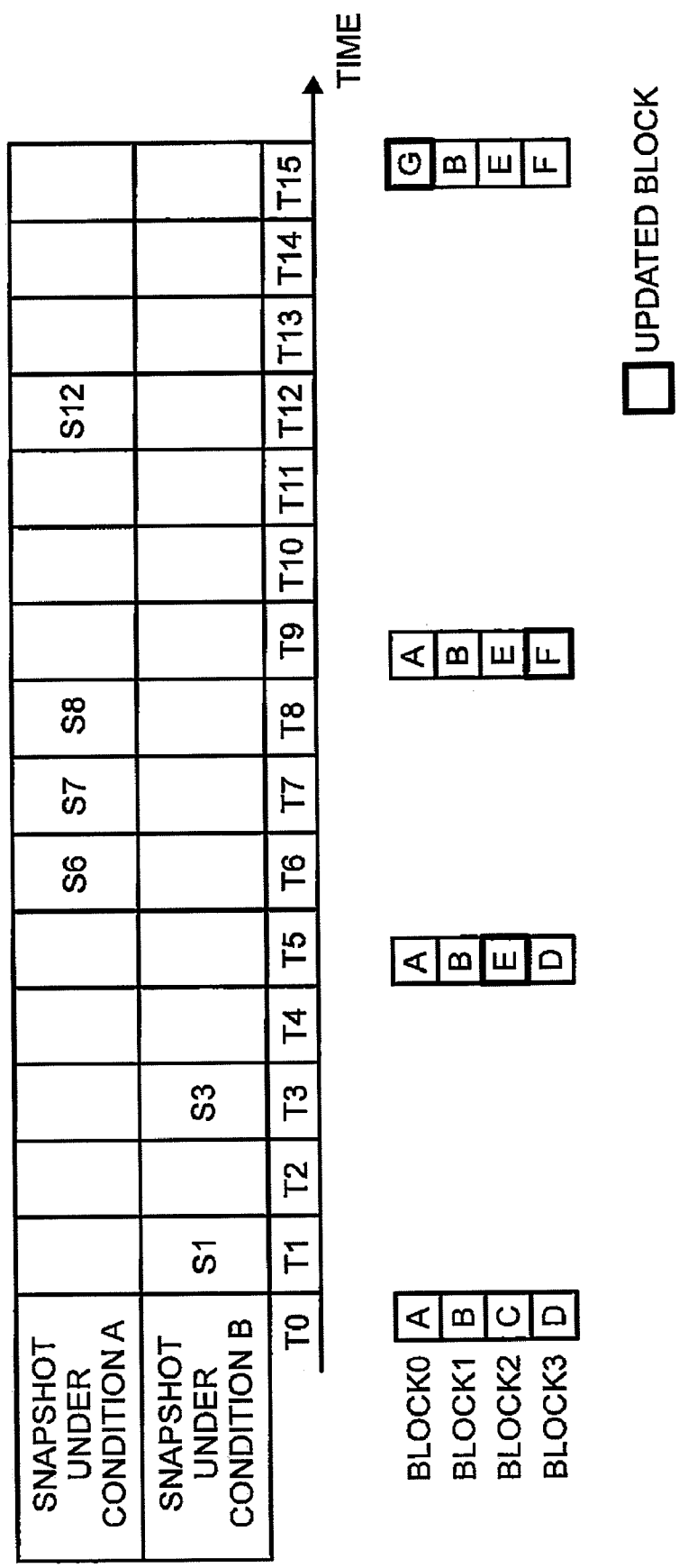
FIG. 16A shows an example of changes over time and file update status, and the time sequence with which snapshots are created for each condition.

FIG. 16A shows an example of changes over time and file update status, and the time sequence with which snapshots are created for each condition.

The file is created at time T0, and is comprised of blocks 0 through 3. In the example shown in FIG. 16A, block 2 of the file is updated at time T5. Next, block 3 of the file is updated at time T9. Finally, block 0 of the file is updated at time T15.

Based on the server 0101a request, the condition A snapshot is created at time T6, T7, T8, and T12 by the micro-program 0204. Based on the server 0101 request, the condition B snapshot is created at time T1 and T3 by the micro-program 0204.

The snapshot inode information 0601 is not created for snapshots S6, S7, and S8 until the file is updated at time T9. When block 2 of the file is updated at time T9, the micro-program 0204 creates the snapshot number S8 snapshot inode information 0601 in accordance with step 1106 in FIG. 14. Snapshot inode information 0601 is not created for snapshots S6 and S7. Similarly, when updating the file at time T5 and T15, the micro-program 0204 does not create snapshot inode information 0601 for snapshots S3 and S12 respectively.

FIG. 16B shows an example of changes in file inode information 0501 and snapshot inode information 0601. In practice, FIG. 16B shows the relationship between file inode information 0501 and snapshot inode information 0601 at time T15 shown in FIG. 16A. When block 2 is updated at time T5 in FIG. 16A, the micro-program 0204 creates snapshot inode information 0601 for snapshot S3 using the block list prior to update (Case 1). When block 3 is updated at time T9 in FIG. 16A, the micro-program 0204 creates snapshot inode information 0601 for snapshot S8 using the block list prior to update (Case 2). Similarly, when block 0 is updated at time T15 in FIG. 16A, the micro-program 0204 creates snapshot inode information 0601 for snapshot S3 using the block list prior to update (Case 3). Cases 4 through 8 are described below.

Figure 17:
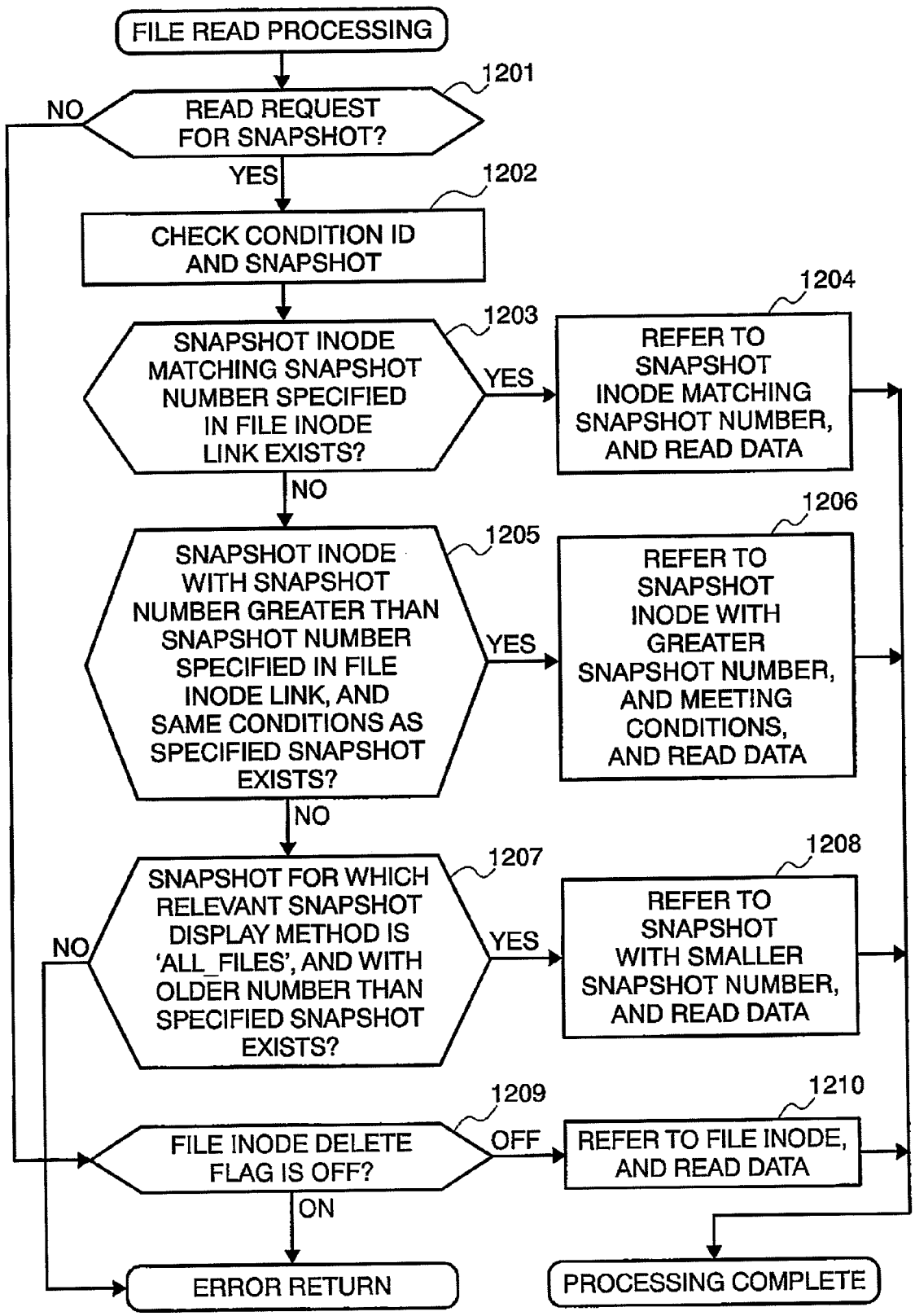
FIG. 17 shows an example of file read request processing.

FIG. 17 shows an example of processing executed by the micro-program 0204 for file read requests.

The micro-program 0204 evaluates whether or not a file read request received from the server 0101 is for a file snapshot (step 1201). This evaluation is conducted with the export point for the storage device system 0104 accessed by the access client 0202. The storage device system 0104 allocates an identifier referred to as an 'export point' to the file storage 0205 and file storage 0205 snapshot 0207. The access client 0202 notifies the storage device system 0104 which file in the file storage 0205 or the snapshot 0207 is to be accessed using a set comprised of an export point and a file path name. The path name is the address of a file relative to the file storage 0205 or the snapshot 0207 top directory.

When the file read request is not a file read request for a snapshot, the micro-program 0204 references the inode information 0501 delete flag 0503 to evaluate whether or not the file has been deleted (step 1207). If the evaluation in step 1207 determines that the file has not been deleted, the micro-program 0204 references the inode information 0501, and reads the data (step 1208). If the evaluation in step 1207 determines that the file has been deleted, the micro-program 0204 returns an error to the access client 0202.

When the file read request is a file read request for a snapshot, the condition ID and the snapshot number are checked (step 1202). The condition ID and the snapshot number in step 1202 can be evaluated to determine whether the access client 0202 has specified a file in file storage, or a file in the snapshot.

Next, the micro-program 0204 checks to determine whether or not the snapshot inode information 0601 linked to the file inode information 0501 includes snapshot inode information 0601 having the snapshot number checked in step 1202 (step 1203). If, as a result of processing in step 1203, it is determined that snapshot inode information 0601 having the snapshot number checked in step 1202 exists, the micro-program 0204 references that snapshot inode information 0601 and reads the data (step 1204).

When, as a result of processing in step 1203, it is determined that snapshot inode information 0601 having the snapshot number checked in step 1202 does not exist, the micro-program 0204 checks, from among snapshot inode information checked in step 1203, whether or not snapshot inode information 0601 created with the same conditions as the relevant conditions exists in snapshot inode information 0601 having a snapshot number greater than the snapshot number checked in step 1202 (step 1205). When snapshot inode information 0601 created with the same conditions as the relevant conditions exists, the micro-program 0204 references that snapshot inode information 0601 and reads the data (step 1206). When snapshot inode information 0601 created in step 1205 with the same conditions as the relevant conditions does not exist, the micro-program 0204 checks whether or not the display method for the snapshot from the condition management table 0301 is 'ALL_FILES', and a snapshot having a number less than the snapshot number exists (step 1207). When snapshot inode information 0601 created with the same conditions as the relevant conditions exists, the micro-program 0204 references the snapshot inode information 0601 and reads the data (step 1208). When snapshot inode information 0601 created with the same conditions as the relevant conditions does not exist, the micro-program 0204 returns an error to the access client 0202.

When the read request is not for reading the snapshot in step 1201, meaning the request is for the specified file for the current file storage, the micro-program 0204 evaluates the file inode information 0501 delete flag 0503 to determine whether the delete flag 0503 of the inode information of the specified file is ON or OFF in step 1209. When the delete flag 0503 is ON, the micro-code 0204 returns an error to the access client 0202. When the delete flag 0503 is OFF, the micro-program 0204 references the inode information 0501 and reads the data.

File read processing for the snapshot in Cases 4 and 5 in FIG. 16B is described below.

Case 4 is equivalent to the processing in step 1206, and shows an example of a file read request from the access client 0202 for the snapshot S7. The snapshot inode information 0601 corresponding to the snapshot S7 is not linked to the inode information inode information 0501. The micro-program 0204 then checks for snapshots having a snapshot number greater than the snapshot S7 under the same conditions as the snapshot S7. The snapshot S8 satisfies these conditions in this example. The micro-program 0204 then reads data from the snapshot S8.

Case 5 is equivalent to the processing in step 1207, and shows an example of processing a file read request from the access client 0202 for the snapshot S12 at time T13. In this case, the snapshot inode information 0601 of the snapshot S12 is not linked to the file inode information 0501, and since a snapshot for which the snapshot number is greater than the snapshot S12, and conditions are the same, does not exist, the micro-program 0204 references the inode information 0501 and reads the data.

Figure 18:
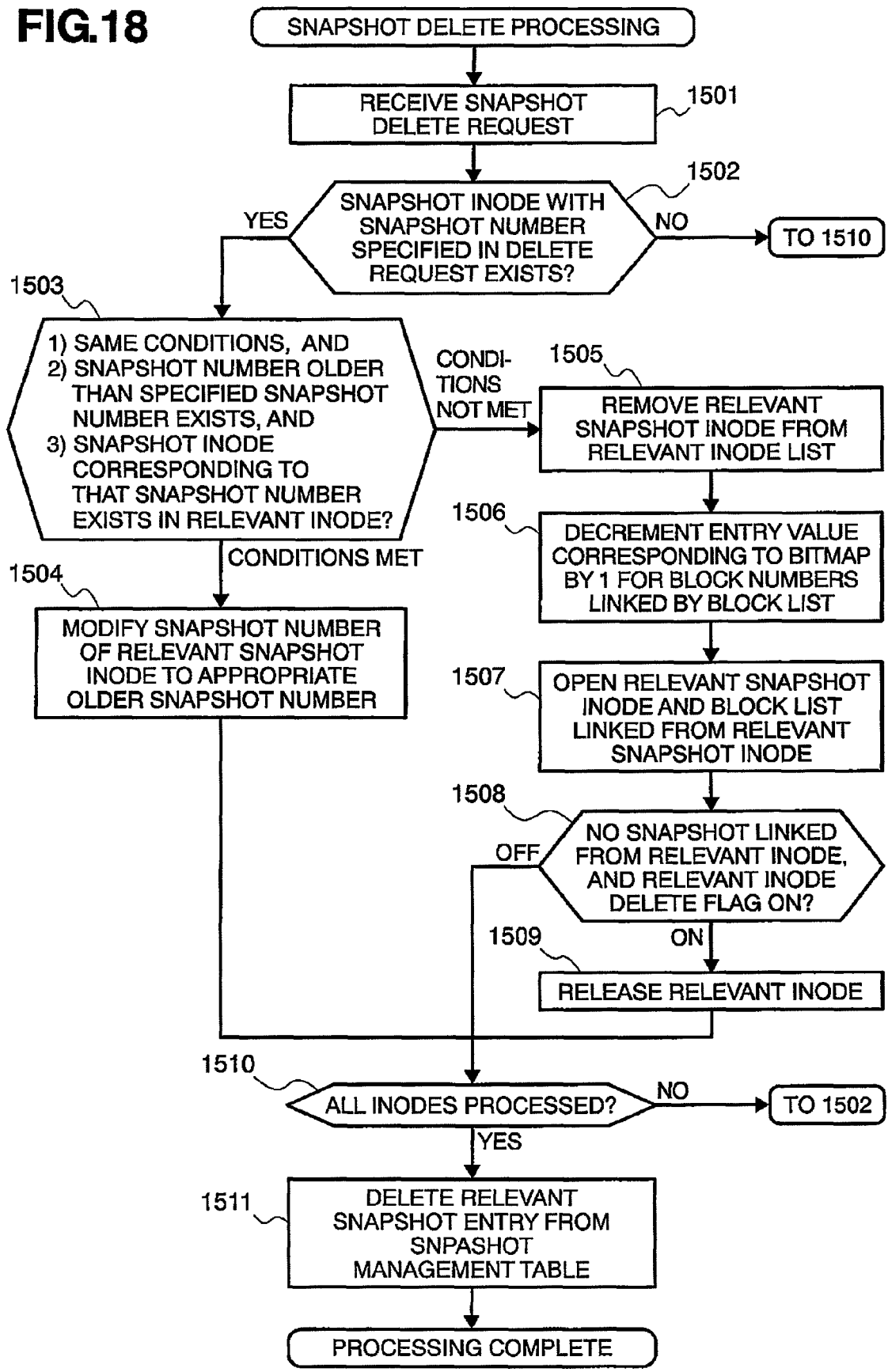
FIG. 18 shows an example of snapshot delete processing.

FIG. 18 shows an example of snapshot delete processing executed by the micro-program 0204.

As with the snapshot creation request, the user 0201 and manager issue a snapshot delete request for the storage device system 0104, and this request is received by the micro-program 0204 (step 1501). The snapshot delete request includes a snapshot number.

The micro-program 0204 checks each inode information 0501 to determine whether or not snapshot inode information 0601 having a snapshot number included in the snapshot delete request exists (step 1502). If snapshot inode information 0601 having a snapshot number included in the snapshot delete request is not included in snapshot inode information 0601 inked from the inode information 0501, the processing in step 1510 is conducted.

If snapshot inode information 0601 having a snapshot number included in the snapshot delete request is included in snapshot inode information 0601 linked from the inode information 0501, the micro-program 0204 checks the snapshot inode information 0601 to determine whether or not a snapshot number created at a time prior to the specified snapshot number and with the same condition ID exists, and whether or not other snapshot inode information 0601 corresponding to an older snapshot number is included in snapshot inode information 0601 linked from the inode information 0501 (step 1503). When the snapshot number exists in step 1503, the snapshot number of the snapshot inode information 0601 created in step 1502 is overwritten with the snapshot number created in step 1503 (step 1504).

If the snapshot number does not exist in step 1504, the snapshot inode information 0601 created in step 1503 is removed from the list from the file inode information inode information 0501 (step 1505). In practice, the file inode information 0501 links connect and manage a plurality of snapshot inode information 0601 in a queue. The snapshot inode information 0601 is extracted from this queue.

Next, the micro-program 0204 decrements by 1 the entry value corresponding to the bitmap table for the block number indicated by the block list pointed to by the pointer 0610 of the block list of the snapshot inode information 0601 (step 1506). The micro-program 0204 then releases the snapshot inode information 0601 and the block list (step 1507). 'Release' refers to setting the snapshot inode information 0601 to the unused status, and setting the disk area allocated to the block list in the unused status. When there is no snapshot inode information 0601 linked from the file inode information 0501, and the file inode information 0501 delete flag is ON, the micro-program 0204 opens the inode information 0501 and conducts the processing in step 1510. When the file inode information 0501 delete flag is OFF, the micro-program 0204 conducts the processing in step 1510.

The micro-program 0204 checks whether or not the processing in step 1502 has been executed for all inode information 0501 (step 1510). When the processing in step 1502 has not been executed for all inode information 0501, the micro-program 0204 conducts the processing in step 1502. When the processing in step 1502 has been executed for all inode information 0501, the micro-program 0204 deletes the snapshot number entry from the snapshot management table 0401 (step 1511).

Snapshot delete processing for cases 6, 7, and 8 shown in FIG. 16B is described below. Case 6 is equivalent to the processing in step 1504, and since the snapshot delete request is for the snapshot S8, the micro-program 0204 deletes the snapshot S8. However since there is no snapshot inode information 0601 for the immediately previous snapshot S7, the snapshot number S7 is overwritten with the S8 snapshot inode information 0601.

Case 7 is equivalent to the processing from step 1505 through 1507, and is the case in which the snapshot delete request is for the snapshot S12. In this case, since the immediately previous snapshot S8 has snapshot inode information, the snapshot S12 entry is deleted.

In Case 8 the snapshot S7 is deleted, and since the snapshot S7 has no snapshot inode information 0601, the micro-program 0204 deletes the S7 entry from the snapshot management table.

Processing in step 1502 and later can be run as a background job to ensure that the performance of file access processing is not affected.

Figure 19:
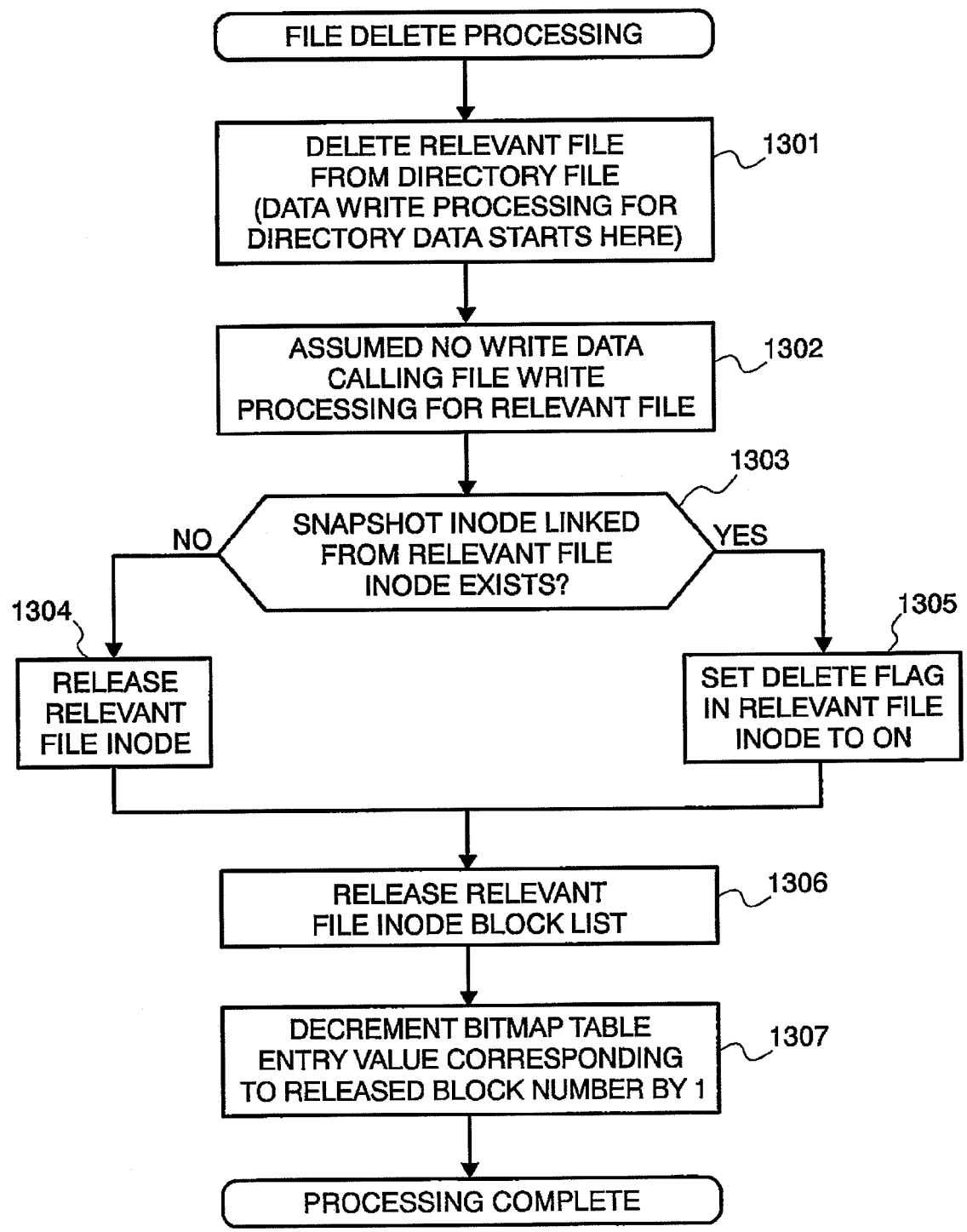
FIG. 19 shows an example of file delete processing.

FIG. 19 shows an example of file delete processing executed by the micro-program 0204.

The micro-program 0204 receiving the file delete request from the server 0101a or the server 0101b deletes the file entry from the file link source directory file (step 1301). At this time, the micro-program 0204 executes the file write processing in FIG. 13 in order to update the directory file. Thus, the directory file old content are stored. Next, the micro-program 0204 executes the file write processing shown in FIG. 13 for the file to be deleted. At this time, control ensures that write data is not specified, and no data is written. Thus, when the snapshot inode information 0601 has not been created for the latest snapshot, the micro-program 0204 creates snapshot inode information 0601 corresponding to the snapshot (step 1302). Next, the micro-program 0204 checks to determine whether or not snapshot inode information 0601 linked from the inode information 0501 of the file to be deleted exists (step 1303). When the snapshot inode information 0601 does not exist, the micro-program 0204 deletes the inode information 0501 (step 1304). When the snapshot inode information 0601 exists, the micro-program 0204 sets the inode information 0501 delete flag to ON (step 1305). The micro-program 0204 then releases the block list pointed from pointer 0610 to the block list of the inode information 0501 (step 1306). Finally, the micro-program 0204 decrements by 1 the entry value of the bitmap table corresponding to the block number released in step 1305 (step 1307).

Figure 20:
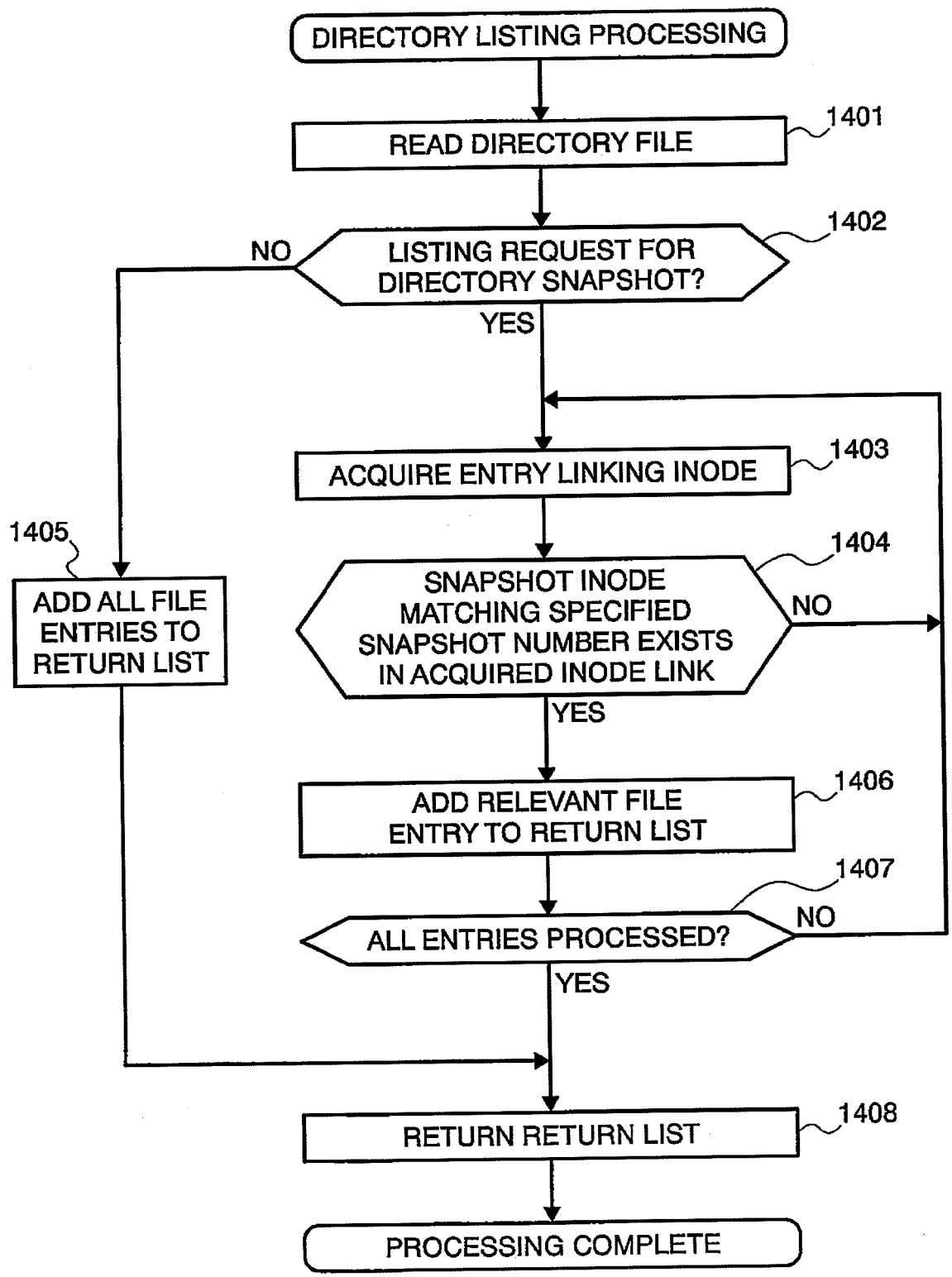
FIG. 20 shows an example of directory listing processing.

FIG. 20 shows an example of the directory listing processing executed by the micro-program 0204. Directory listing is the display by the storage device system 0104 on the display screen and the like used by the user 0201 of the file and sub-directory structure existing in the directory specified by the user 0201 via the access client 0202.

The micro-program 0204 reads the directory file for the specified directory (step 1401). In practice, this processing calls the routine in FIG. 12. Thus, since the user 0201 searches for a file in the snapshot, the directory snapshot may be searched when a directory listing request is issued.

The micro-program 0204 evaluates whether or not the listing request is for the directory snapshot (step 1402). At this time, the micro-program 0204 calls the routine in FIG. 12, and acquires the snapshot number. If the listing request is for the current directory, all file entries in the directory file are added to the return list (step 1405). The micro-program 0204 then calls the return list, and displays the return list on the display screen and the like (step 1408).

In step 1402, if the listing request is for the directory snapshot, the entry linked by the file inode information 0501 is acquired (step 1403). The micro-program 0204 checks whether or not snapshot inode information 0601 matching the snapshot number specified by the access client 0202 exists in this inode information 0501 linking the snapshot inode information 0601 (step 1404). When snapshot inode information 0601 matching the snapshot does not exist, processing proceeds to the next entry. When snapshot inode information 0601 matching the snapshot exists, the micro-program 0204 adds the file entry to the return list (step 1406). Thus, the user 0201 can check on the display screen and the like only files for conditions corresponding to the specified snapshot. The micro-program 0204 checks whether or not processing from step 1403 through 1407 has been executed for all entries (step 1407). When processing from step 1403 through 1407 has not been executed for all entries, processing proceeds to the next entry. When processing from step 1403 through 1407 is complete for all entries, the micro-program 0204 calls the return list and displays the return list on the display screen and the like (step 1408).

In step 1404, even with a file for which the snapshot number does not match, and for which a snapshot has been created with different conditions, if a snapshot created prior and closest to the time the snapshot was created exists, the micro-program 0204 adds that snapshot to the return list. Thus, the micro-program 0204 can display the file system tree configuration shown in FIG. 5B on the display screen and the like.

Figure 21:
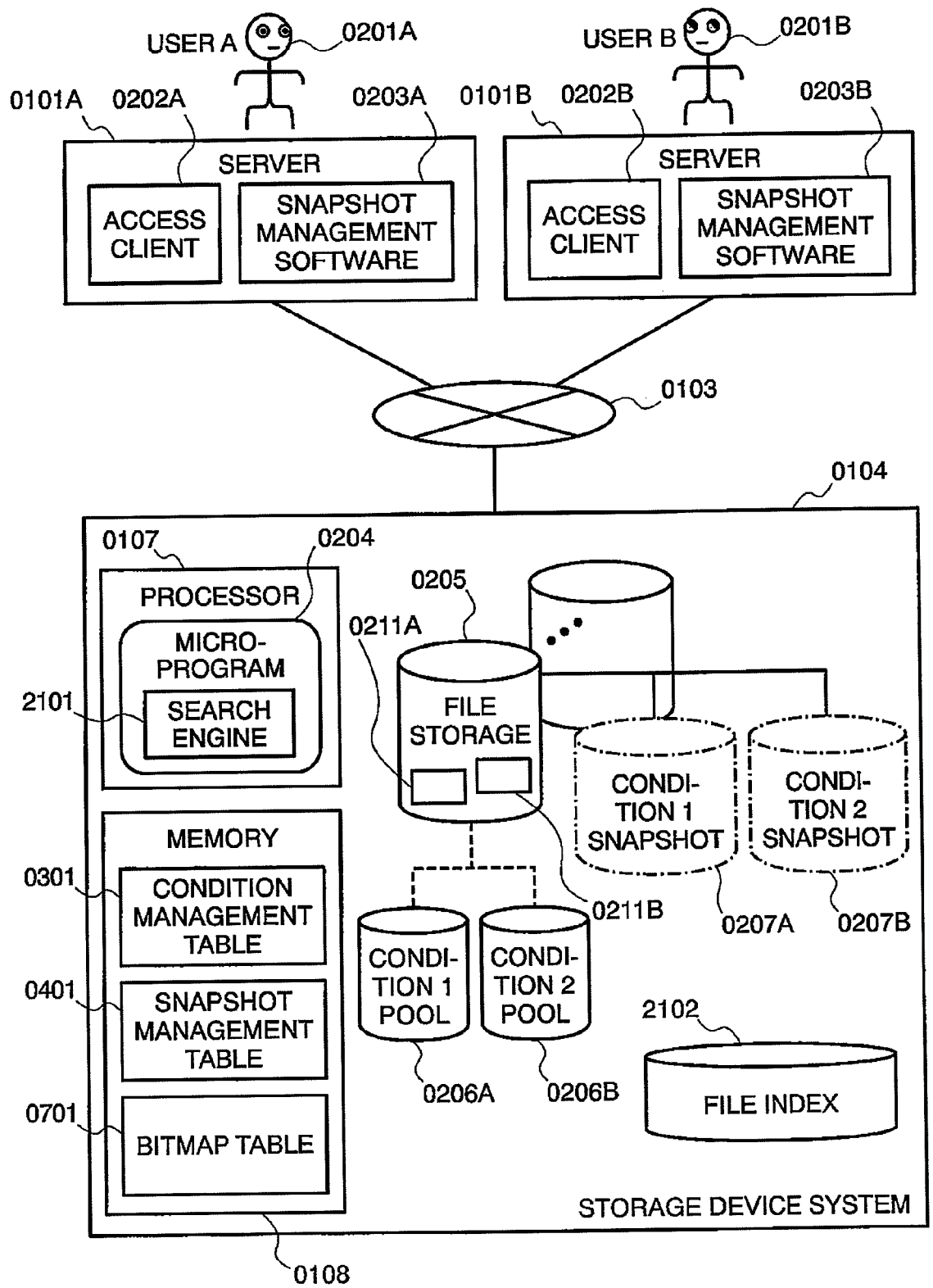
FIG. 21 shows an example of the configuration of a computer system having a file search function.

FIG. 21 shows an example of the configuration of a computer system having a file search function. The micro-program 0204 has a search engine 2101 being a function to search for the content of a file in file storage 0205, and create a file index 2102, as an internal function. In FIG. 3, by specifying a keyword in the conditional expression 0303, the file including the keyword specified when the snapshot was created can be set as the target of the snapshot In the present embodiment, a snapshot is created for a file, however a snapshot may also be created for an OSD (Object-based Storage Device) object, or for a collection of volumes. Ethernet, Fiber Channel, or InfiniBand and the like can be used for the network connecting the server 0101 and the storage device system 0104. Furthermore, TCP/IP, FCP (Fiber Channel Protocol), ISCSI (Internet SCSI), SRP (SCSI RDMA Protocol) and the like can be used as the communications protocol.

In the present embodiment, target files are limited with the conditional expression, however a conditional expression in which all files in file storage are target files may also be specified.

Furthermore, in the present embodiment, one volume is shared for file data storage and as the pool, however the volume storing file data and the volume used as the pool may be separate.

What is claimed is:

1. A data management method in a storage device system including a control device connected to a computer, and a storage device connected to the control device, the data management method comprising:

the control device receiving conditions for determining whether or not to save data stored at a certain point in time in a file from among one or a plurality of files stored in the storage device;

the control device storing the conditions in the storage device system;

the control device determining whether or not to create a snapshot for a subject file, which is one of the plurality of files based at least in part on an owner name of the subject file, as a snapshot creation condition;

the control device receiving from the computer a request including specification of snapshot creation condition to save data stored in the subject file, and determining, based on the request, the subject file which meets the snapshot creation condition, including the owner name, and for which data stored at a certain point in time in the subject file is to be saved;

the control device deciding, when a write request for the one or more files is received from the computer, after receipt of the request, whether or not a file corresponding to the write request is a file meeting the snapshot creation condition included in the request;

the control device saving the data stored in the area corresponding to the write request, and then writing the data to the area specified in the write request in accordance with the write request, if a file corresponding to the write request is a file meeting the snapshot creation condition included in the request; and the control device writing the data to an area corresponding to the write request in accordance with the write request, if a file corresponding to the write request is not a file meeting the snapshot creation condition.

2. A data management method according to claim 1:

wherein the control device receives from the computer a request including specification of the snapshot creation condition to save data stored in the subject file, and the control device determines, based on the request, the subject file which meets the snapshot creation condition included in the request and for which data stored at a certain point in time in the subject file is to be saved;

the control device receiving specification of the capacity of the storage area for saving a file that meets the snapshot creation condition and data stored at a certain point in time in the file;

the control device storing the capacity in the storage device system;

the control device storing the capacity in the storage device system;

the control device deciding, when a write request for the one or more files is received from the computer, after receipt of the request, whether or not a file corresponding to the write request is a file meeting the snapshot creation condition included in the request;

the control device deciding whether or not the capacity has been exceeded when data at a certain point in time in a file meeting the snapshot creation condition included in the request is saved, if a file corresponding to the write request is a file meeting the snapshot creation condition included in the request; and the control device writing the data to the area corresponding to the write request in accordance with the write request if a file corresponding to the write request is not a file meeting the snapshot creation condition contained in the request.

3. The data management method according to claim 2, comprising:

the control device writing the data to the area corresponding to the write request in accordance with the write request after saving data stored in the area corresponding to the write request, when judged as not exceeding the capacity; and the control device deleting part of the data at a certain point in time in a file that meets the conditions when judged as exceeding the capacity.

4. The data management method according to claim 1, wherein the snapshot creation condition for determining whether or not to save data stored at a certain point in time includes the owner name as one said snapshot creation condition.

5. The data management method according to claim 1, wherein the snapshot creation condition for determining whether or not to save data stored at a certain point in time include a keyword included in the data content as one said snapshot creation condition.

6. A storage device system comprising:

a control device connected to a computer; and a storage device connected to the control device, wherein the control device receives conditions for determining whether or not to save data stored at a certain point in time in a file from one or a plurality of files stored in the storage device, and stores the conditions in the storage device system;

wherein the control device is adapted to determine whether or not to create a snapshot for a subject file, which is one of the plurality of files, based at least in part on an owner name of the subject file, as a snapshot creation condition, the control device is adapted to receive from the computer a request including specification of the snapshot creation condition to save data stored in the subject file, and to determine, based on the request, the subject file which meets snapshot creation condition included in the request and for which data stored at a certain point in time in a file is to be stored;

the control device adapted to decide, when a write request for the one or more files is received from the computer, after receipt of the request, whether or not a file corresponding to the write request is a file that meets the snapshot creation condition included in the request, the control device is adapted to save the data stored in the area corresponding to the write request, and then writes the data to the area specified in the write request in accordance with the write request, if a file corresponding to the write request is a file meeting the snapshot creation condition included in the request, and the control device is adapted to write the data to an area corresponding to the write request in accordance with the write request, if a file corresponding to the write request is not a file meeting the snapshot creation condition.

7. A storage device system according to claim 6;

wherein the control device adapted to receive from the computer a request including specification of the snapshot creation condition to save data stored in the subject file, and to determine, based on the request, the subject file which meets the snapshot creation condition included in the request and for which data stored at a certain point in time in a file is to be saved;

the control device adapted to receive specification of the capacity of the storage area for saving a file that meets the snapshot creation condition and data stored at a certain point in time in the file, the control device is adapted to store the capacity in the storage device system;

the control device is adapted to decide, when a write request for the one or more files is received from the computer, after receipt of the request, whether or not a file corresponding to the write request is a file meeting the snapshot creation condition included in the request, the control device is adapted to decide whether or not the capacity has been exceeded when data at a certain point in time in a file meeting the snapshot creation condition included in the request is saved, if a file corresponding to the write request is a file meeting the snapshot creation condition included in the request, and the control device is adapted to write the data to the area corresponding to the write request in accordance with the write request if a file corresponding to the write request is not a file meeting the snapshot creation condition contained in the request.

8. The storage device system according to claim 7, comprising:

the control device is adapted to write the data to the area corresponding to the write request in accordance with the write request after saving data stored in the area corresponding to the write request, when judged as not exceeding the capacity; and the control device is adapted to delete part of the data at a certain point in time in a file that meets the snapshot creation condition when judged as exceeding the capacity.

9. The storage device system according to claim 6, wherein the snapshot creation condition for determining whether or not to save data stored at a certain point in time include the owner name as one said snapshot creation condition.

10. The storage device system according to claim 6, wherein the snapshot creation condition for determining whether or not to save data stored at a certain point in time include a keyword included in the data content as one said snapshot creation condition.

11. The storage device system according to claim 6, wherein the computer adapted to display a file tree of the snapshot based on the snapshot creation condition.

* * * * *